(12) United States Patent
Navas Cornejo et al.

(10) Patent No.: US 9,866,452 B2
(45) Date of Patent: Jan. 9, 2018

(54) METHODS AND APPARATUSES FOR CONTROL OF USAGE OF ONE OR MORE SERVICES FOR A USER

(71) Applicant: Telefonaktiebolaget L M Ericsson (publ), Stockholm (SE)

(72) Inventors: Angel Navas Cornejo, Leganes (ES); Marta Montejo Ayala, Getafe (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 264 days.

(21) Appl. No.: 14/787,385

(22) PCT Filed: Apr. 29, 2013

(86) PCT No.: PCT/EP2013/058866
§ 371 (c)(1),
(2) Date: Oct. 27, 2015

(87) PCT Pub. No.: WO2014/177173
PCT Pub. Date: Nov. 6, 2014

(65) Prior Publication Data
US 2016/0156529 A1    Jun. 2, 2016

(51) Int. Cl.
*H04L 12/24*    (2006.01)
*H04L 29/08*    (2006.01)
(Continued)

(52) U.S. Cl.
CPC ...... *H04L 41/5067* (2013.01); *H04L 12/1407* (2013.01); *H04L 43/0876* (2013.01); *H04L 43/16* (2013.01); *H04L 67/306* (2013.01)

(58) Field of Classification Search
CPC ............. H04L 41/5067; H04L 12/1407; H04L 12/1403; H04L 43/16; H04L 43/0876;
(Continued)

(56) References Cited

U.S. PATENT DOCUMENTS

| | | | |
|---|---|---|---|
| 6,836,466 B1 * | 12/2004 | Kant | H04L 29/06 370/232 |
| 6,857,020 B1 * | 2/2005 | Chaar | G06Q 10/10 709/223 |

(Continued)

FOREIGN PATENT DOCUMENTS

| WO | WO 2010/095036 A1 | 8/2010 |
|---|---|---|
| WO | WO 2012/079647 A1 | 6/2012 |

OTHER PUBLICATIONS

PCT Notification of Transmittal of the International Search Report and the Written Opinion of the International Searching Authority, or the Declaration for International application No. PCT/EP2013/058866, dated Apr. 22, 2014.

(Continued)

*Primary Examiner* — Ruolei Zong
(74) *Attorney, Agent, or Firm* — Baker Botts, LLP

(57) ABSTRACT

The present invention faces the issue of usage monitoring and control of network resources, between a control server and any reporting device. The present invention provides for methods and apparatuses, which significantly reduce the signalling load between the control server and the reporting device, by allowing the control server to submit towards any reporting device, for each identified monitoring key, the identified monitoring key, its monitoring quota and one or more related monitoring keys to be reported together with the identified monitoring key; to receive at the control server, from any reporting device, usage information for at least one monitoring key, whose monitoring quota has been exhausted, and usage information for the related monitoring keys previously submitted with the at least one monitoring key; and to update at the control server, for each service associated with any monitoring key for which usage infor-
(Continued)

mation has been received, a corresponding service quota by using the received usage information.

32 Claims, 13 Drawing Sheets

(51) Int. Cl.
    *H04L 12/14* (2006.01)
    *H04L 12/26* (2006.01)
(58) Field of Classification Search
    CPC .. H04L 43/12; H04L 29/06523; H04L 67/306
    USPC .......................................................... 709/223
    See application file for complete search history.

(56) References Cited

U.S. PATENT DOCUMENTS

| | | | |
|---|---|---|---|
| 8,203,950 B2* | 6/2012 | Cometto | H04L 47/10 370/230.1 |
| 2004/0148383 A1* | 7/2004 | Gonsalves | H04L 43/026 709/224 |
| 2007/0026854 A1* | 2/2007 | Nath | H04W 24/00 455/423 |
| 2012/0303795 A1 | 11/2012 | Mo et al. | |
| 2013/0024567 A1* | 1/2013 | Roxburgh | G06F 11/3006 709/224 |

OTHER PUBLICATIONS

3GPP TS 29.212 v12.0.0; Technical Specification; 3rd Generation Partnership Project; Technical Specification Group Core Network and Terminals; Policy and Charging Control (PCC); Reference points (Release 12), Mar. 2013.

3GPP TR 23.858 v1.1.0; Technical Report; 3rd Generation Partnership Project; Technical Specification Group Services and System Aspects; Usage Monitoring Control PCC Enhancement (Release 12), Feb. 2013.

* cited by examiner

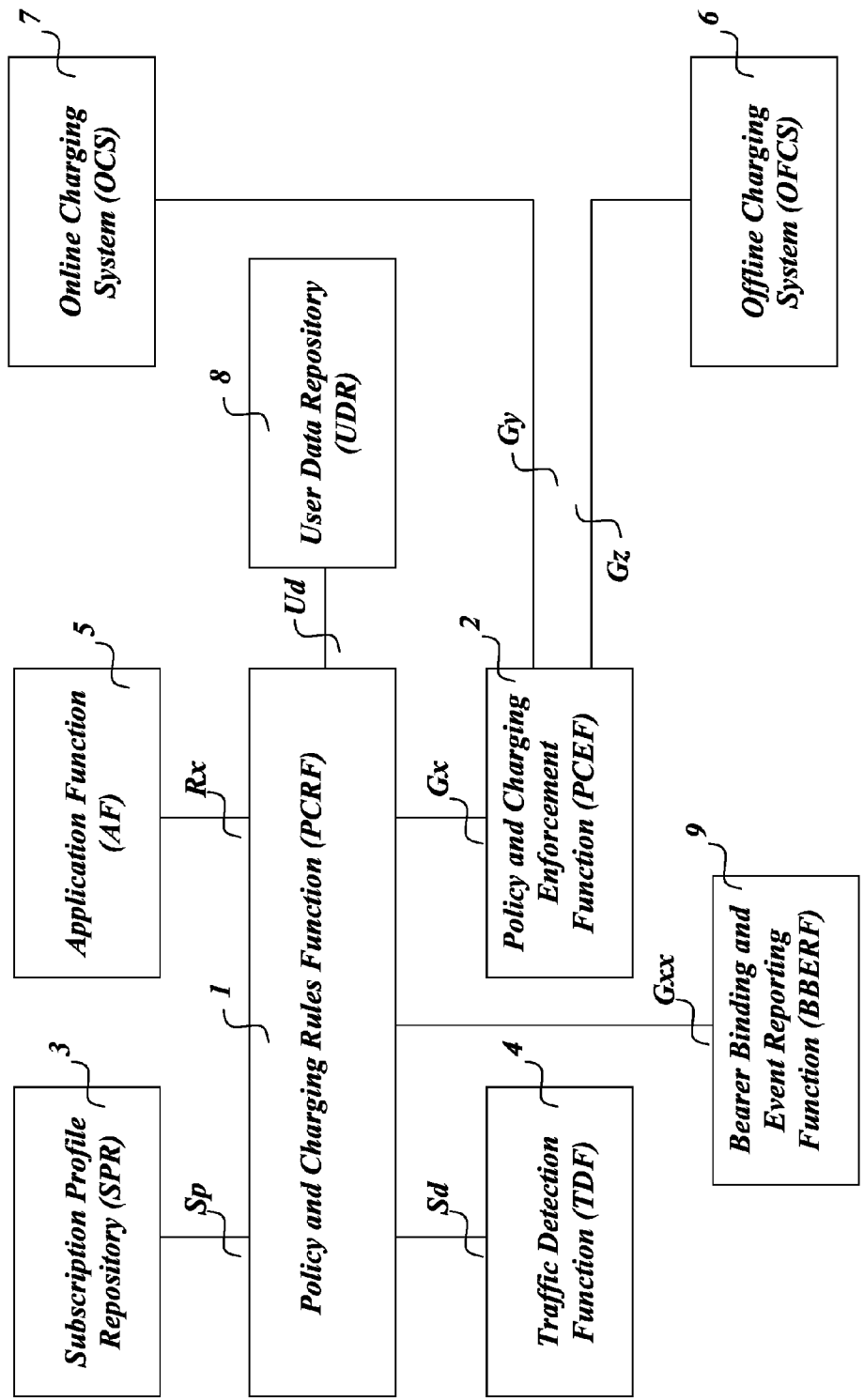
FIG. -1-

FIG. -2-

| SERVICE | MONITORING KEYS | SERVICE QUOTA | SLICE |
|---|---|---|---|
| Internet | A, B, C, D | 3 GB | 20 MB |
| Social Services | A, B, C | 2 GB | 10 MB |
| Gaming | E | 1 GB | 10 MB |
| ... ... ... | ... ... ... | ... | ... |

FIG. -3-

| MONITORING KEY | SERVICES | MONITORING QUOTA | RELATED KEYS |
|---|---|---|---|
| A | Internet, Social Services | 10 MB | B, C, D |
| B | Internet, Social Services | 10 MB | A, C, D |
| C | Internet, Social Services | 10 MB | A, B, D |
| D | Internet | 20 MB | A, B, C |
| E | Gaming | 10 MB | Null |
| ... ... ... | ... ... ... | ... | ... |

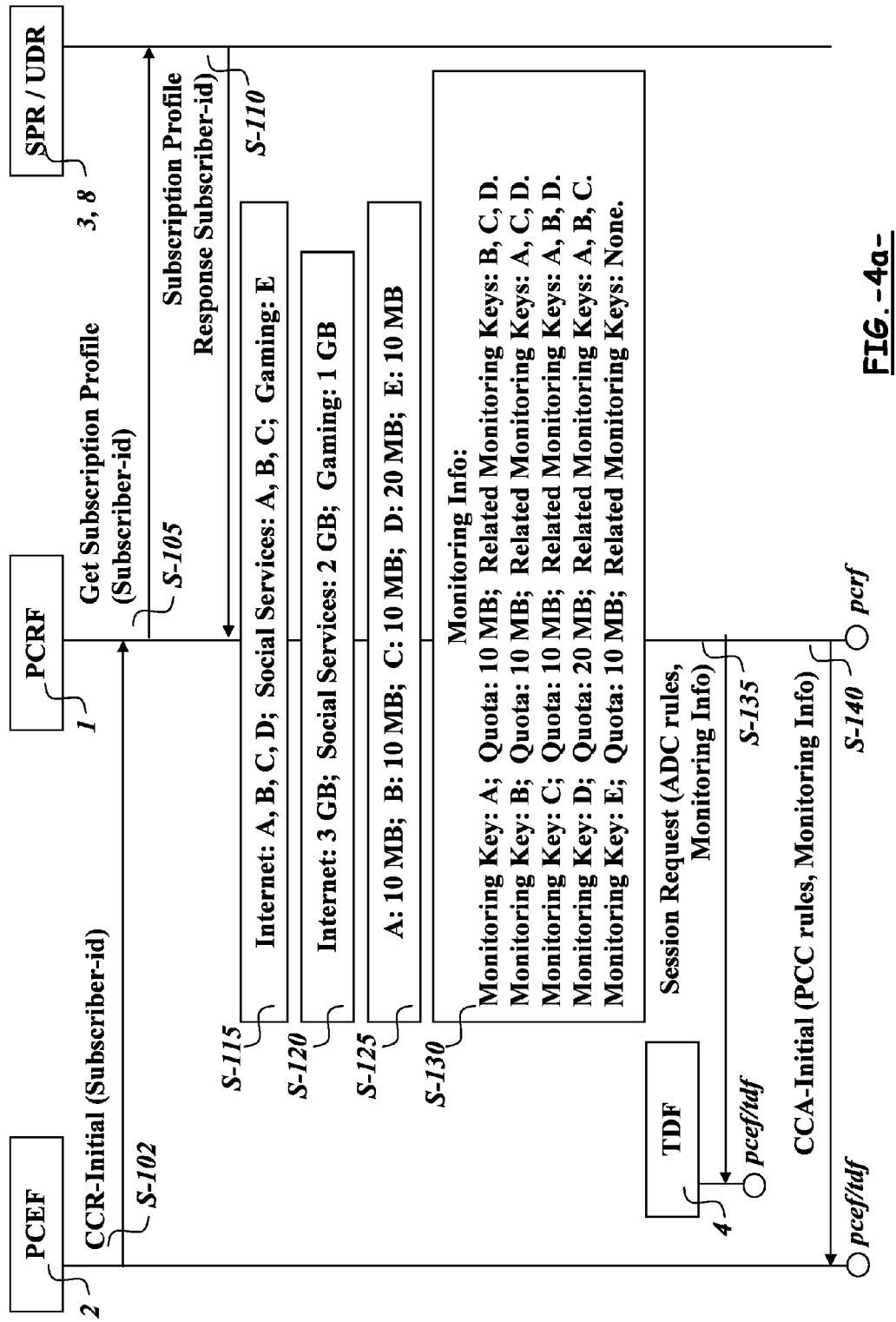
FIG. -4a-

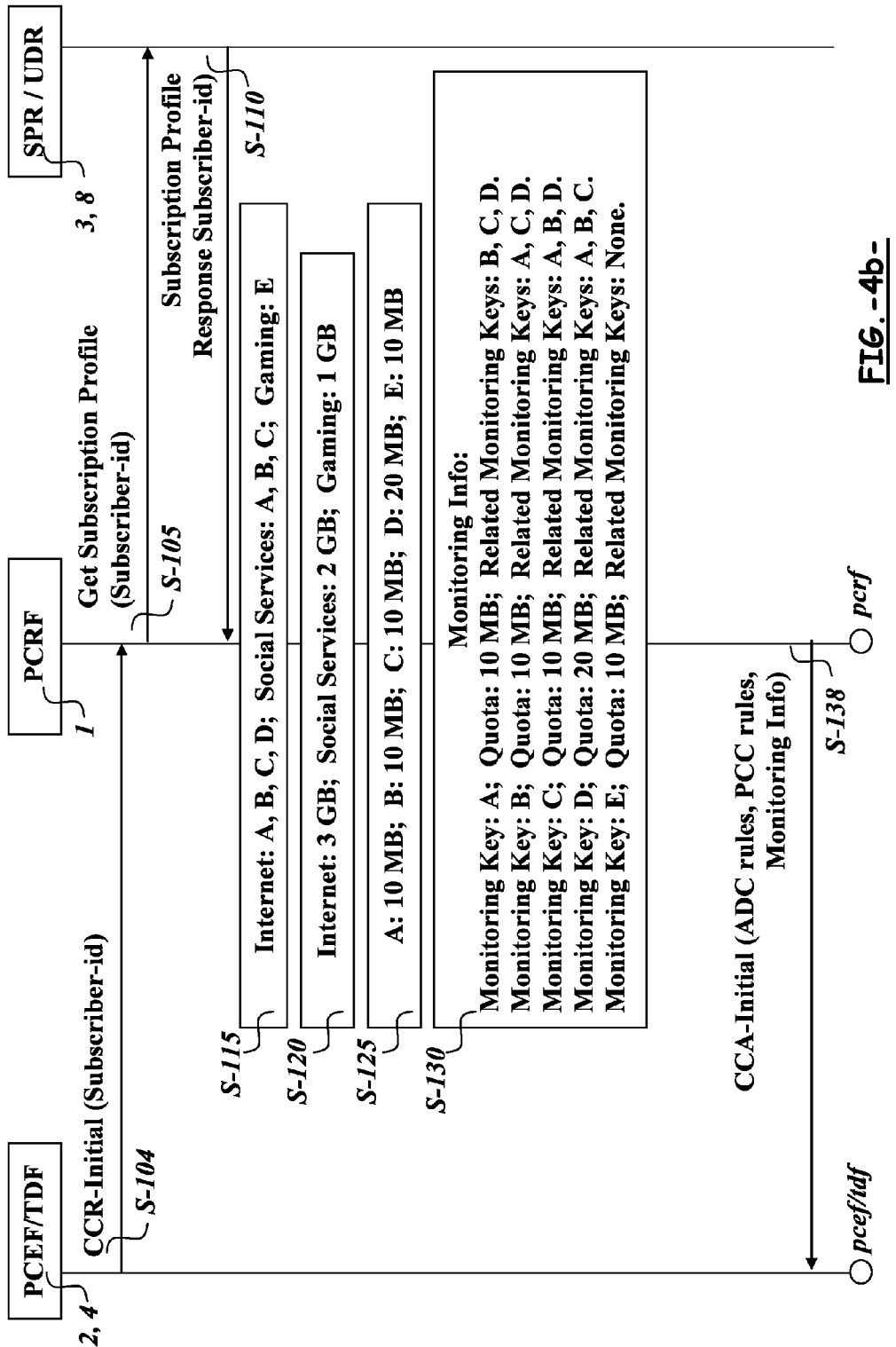
FIG. -4b-

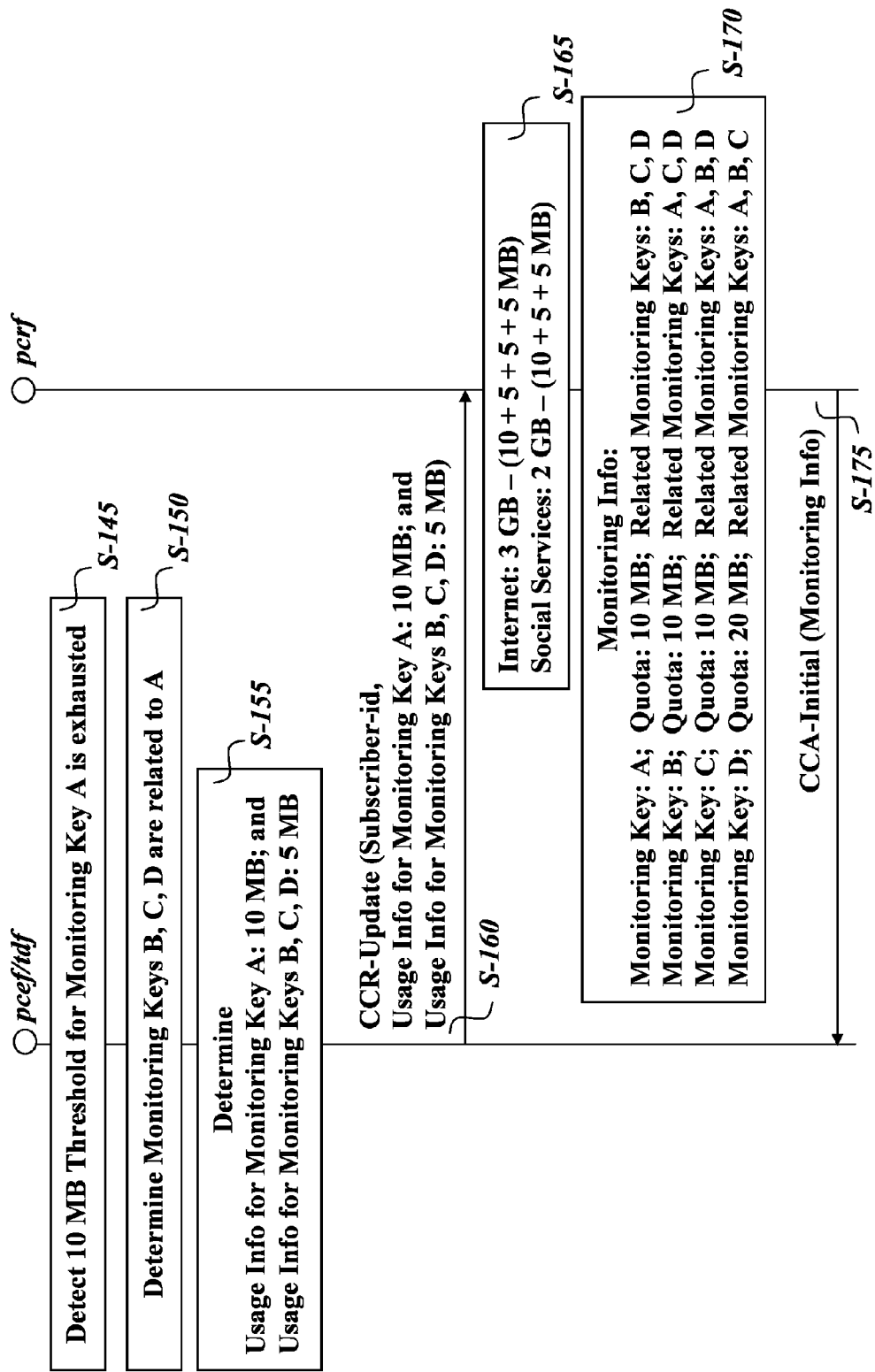

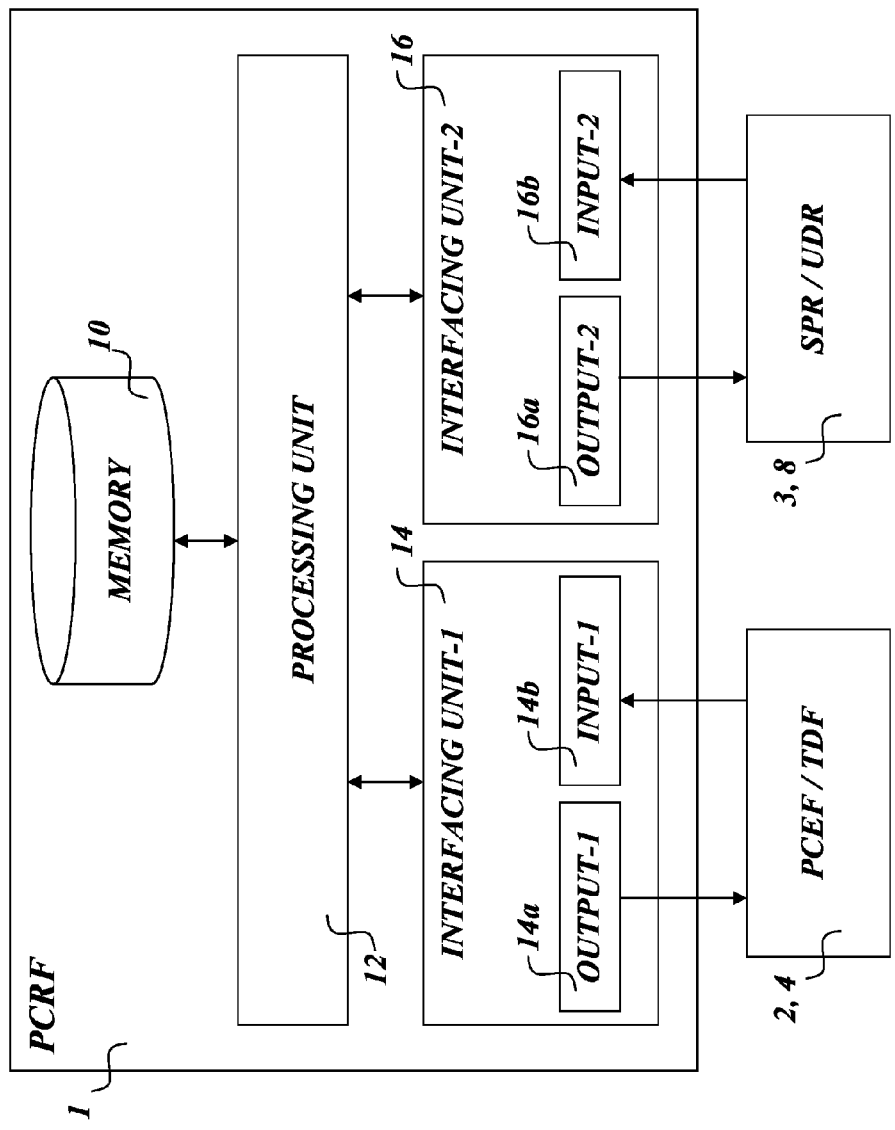
FIG. -6-

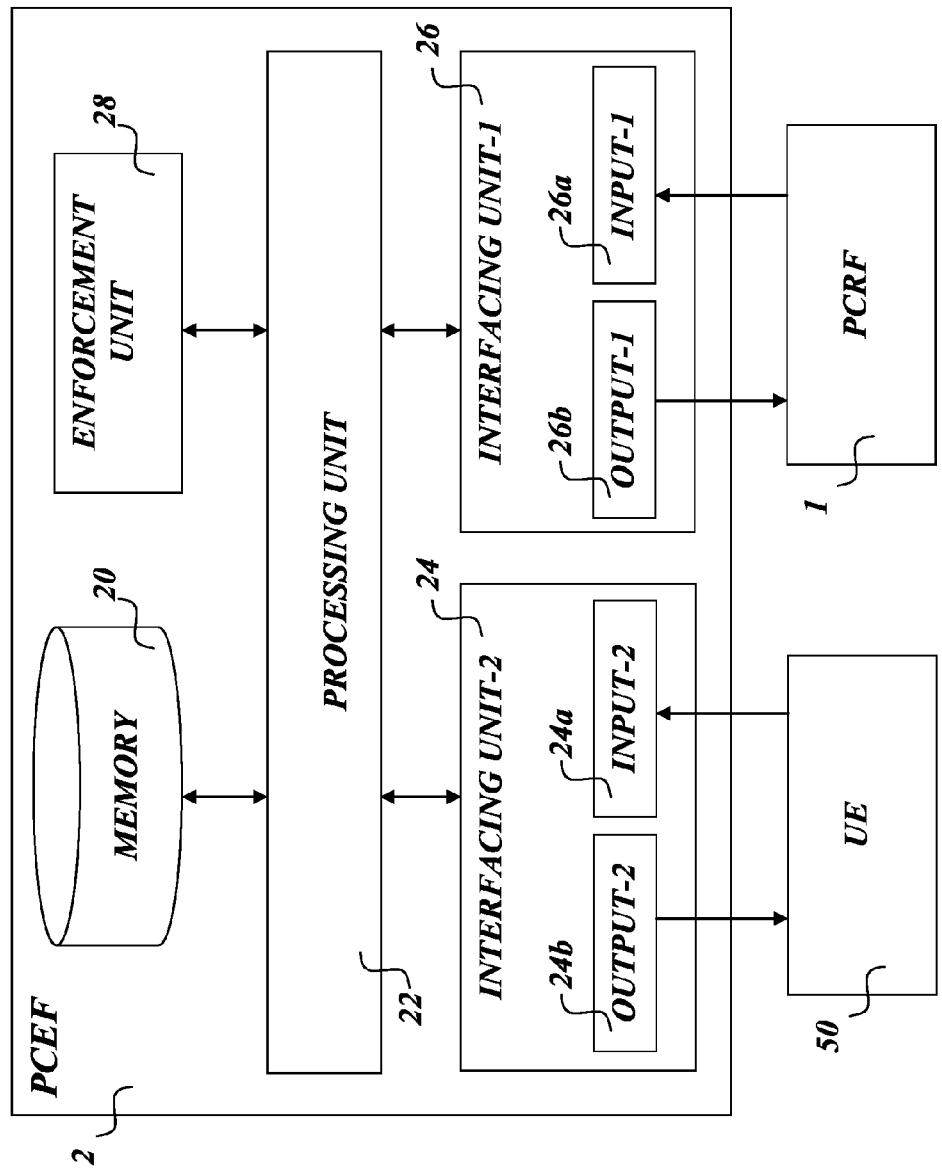
FIG. -7-

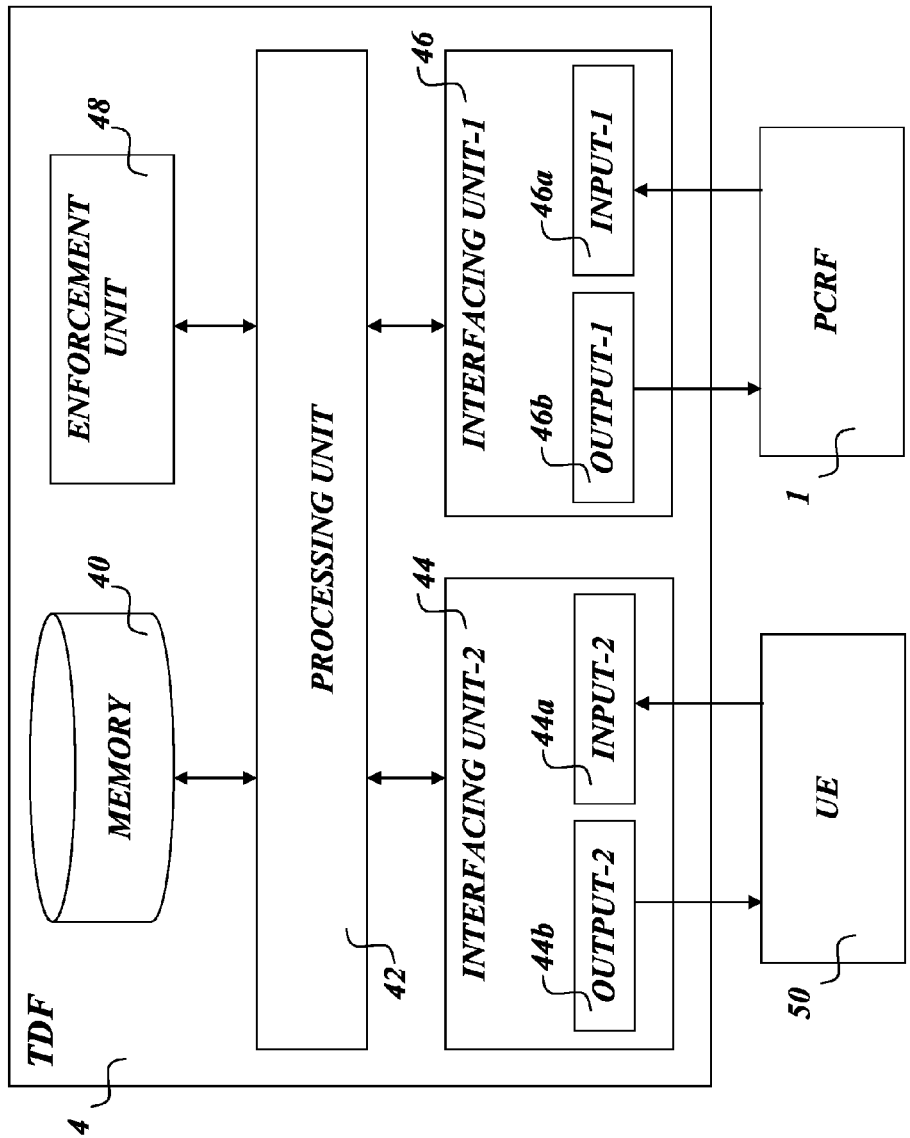
FIG. -8-

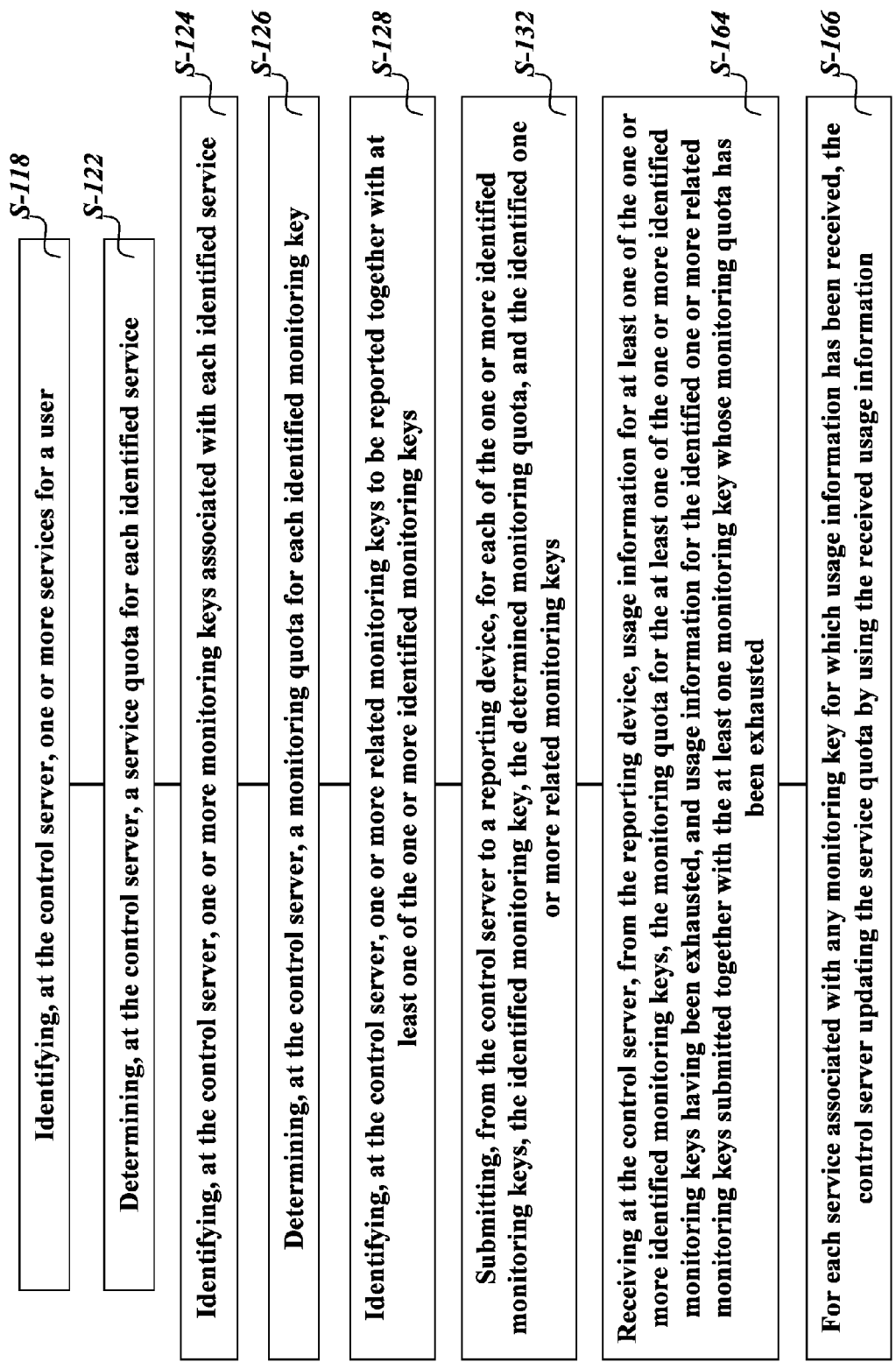

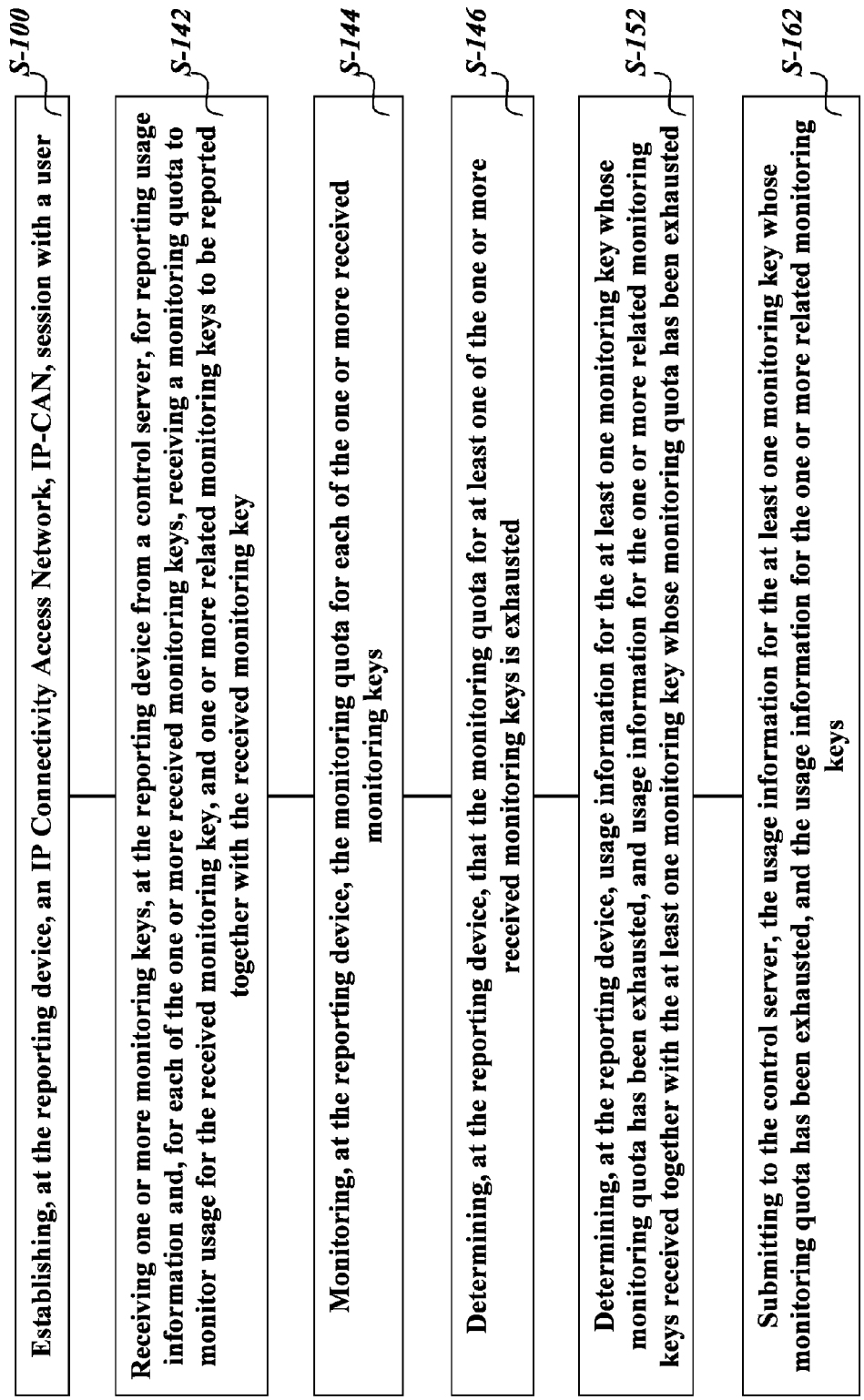
FIG.-10-

METHODS AND APPARATUSES FOR CONTROL OF USAGE OF ONE OR MORE SERVICES FOR A USER

PRIORITY

This nonprovisional application is a U.S. National Stage Filing under 35 U.S.C.§371 of International Patent Application Serial No. PCT/EP2013/058866, filed Apr. 29, 2013, and entitled "Methods And Apparatuses For control Of Usage Of One Or More Services For A User."

TECHNICAL FIELD

The present invention generally relates to usage monitoring and control of network resources and, more specifically, to control of usage of one or more services for a user.

BACKGROUND

Most of the telecommunication operators had been developing data plans for users which took into account combinations of usage quotas for different services. At present, with the current growth of different data plans in broadband scenarios, more complex and evolved data plans turn up, where the number of combinations of services and corresponding prices have also considerably increased.

Current trends on data plans for users point to combination of services in such a manner that the whole combination is given a maximum usage quota and each particular service in the combination is also given a maximum usage quota. In these data plans, a flat tariff is generally applied whilst the maximum usage quotas are not surpassed and a higher tariff or other limitations are applied when any maximum usage quota is surpassed.

For example, Alice, as subscriber or user of a telecommunication network, is given a data plan with i) a maximum of a 30 Mb usage allowed per month for streaming services and P2P downloading, in which ii) streaming services should not surpass 10 Mb per month. In this example, where Alice attaches the telecommunication network and accesses only P2P downloading, the limit of a 30 Mb usage per month applies and the network only needs to monitor this value; however, where Alice attaches the telecommunication network and accesses both streaming services and P2P downloading, both limits, 10 Mb for streaming and 30 Mb for streaming and P2P downloading, apply simultaneously.

Two alternatives are currently under development to handle scenarios like the above Alice's subscription, as disclosed in 3GPP TR 23.858 V1.1.0, wherein entities of a Policy and Charging Control (PCC) architecture are involved.

The Policy and Charging Control (PCC) architecture and functionality is specified in 3GPP TS 23.203 V12.0.0 for Evolved 3GPP Packet Switched domain, including both 3GPP accesses (GERAN/UTRAN/E-UTRAN) and Non-3GPP accesses. Conventionally, and for the purpose of the present invention, the Policy and Charging Control (PCC) architecture includes a Policy and Charging Enforcement Function (PCEF) in charge of traffic flow detection and enforcement of applicable policies to user traffic flows; a Policy and Charging Rules Function (PCRF) in charge of providing network control for the traffic flow detection by holding policies and providing PCC rules to the PCEF per user traffic flow basis for enforcement of such policies; a Subscription Profile Repository (SPR) in charge of providing subscription data for a user to the PCRF; and a Traffic Detection Function (TDF) in charge of performing application's traffic detection and reporting of the detected application to the PCRF. This PCC architecture may also include a Bearer Binding and Event Reporting Function (BBERF) which, for the purpose of the present invention, behaves in a similar manner and for a similar purpose as the PCEF, but for receiving and handling Quality of Service (QoS) rules instead of PCC rules. Apart from that, a User Data Repository (UDR) as disclosed in 3GPP TS 23.335 may replace the SPR for provision of subscription data.

In accordance with 3GPP TS 29.212 V12.0.0, the PCRF may handle multiple usage monitoring control instances. To this end, a monitoring key identifies a monitoring control instance that shall be used for usage monitoring control of service data flows. The usage monitoring control makes it use of data collected per monitoring key, which may apply for a single service data flow (SDF), a set of SDFs or for all the traffic in an IP Connectivity Access Network (IP-CAN) session established by a user. In this context, a monitoring key for a PCC rule identifies one, more or all SDFs to be controlled by said PCC rule. Moreover, a monitoring key can thus apply to one or more PCC rules or to the whole IP-CAN session.

In operation, at IP-CAN session establishment, the PCRF may obtain information about total usage allowed for a service and one or more monitoring keys associated with the service to control the total service usage. Moreover, at IP-CAN session establishment and modification, the PCRF may provide applicable thresholds for usage monitoring control to the PCEF, along with the respective monitoring keys. That is, the total service usage is controlled by monitoring the thresholds for the monitoring keys.

Generally speaking, data plans may be thus constructed with great varieties of combination of services with different respective usage quotas that, depending on the particular one or more services accessed by the user, are applied alone or in combination. For example, a user may be given a quota for Internet Services of 1 GB, with monitoring keys A, B, C and D; a quota for Social Services of 0.75 GB, with monitoring keys A, B and C; and a quota for Gaming Services of 0.75 GB, with monitoring key E, wherein each monitoring key is given a particular threshold, namely, a monitoring quota.

In order to control the usage of Internet, Social and Gaming Services, the PCRF downloads monitoring quotas for monitoring keys: A, B, C, D and E to the PCEF; the PCEF reports per monitoring key basis; and the PCRF implements the required logic to combine the different reports per monitoring key basis, in order to calculate the usage per each service involving more than one monitoring key.

In the exemplary case given above, where the PCEF reports that the monitoring quota for monitoring key A is exhausted, the PCRF cannot determine yet whether the service quota for Internet and Social Services has been reached. In this situation, the PCRF should wait for a reporting of B, C and D before detecting if the service quota for Internet Services has been exceeded.

These combinations of several monitoring quotas for each particular service, as currently conceived, require significantly extra signalling between PCRF and PCEF, as well as an additional processing capacity at the PCRF to calculate the service quota for each combination and to update the PCEF with remaining monitoring quota for each monitoring key involved in each combination.

There is thus a need to find an alternative mechanism for control of usage of one or more services for a user, to be applied between a control server and any reporting device, which significantly reduces the signalling load between the control server and the reporting device and which optimizes the usage control of services associated with several monitoring keys.

SUMMARY

The present invention aims to at least mitigate some or all of the above drawbacks and provides for new methods and apparatuses for control of usage of one or more services for a user, between a control server and any reporting device, which may significantly reduce the signalling load between the control server and the reporting device.

In accordance with a first aspect of the present invention, there is provided a new method for control of usage of one or more services for a user, the method applying in a control server.

This method comprises the steps, carried out at the control server, of: identifying one or more services for a user and determining a service quota for each identified service; identifying one or more monitoring keys associated with each identified service, and determining a monitoring quota for each identified monitoring key.

This method also comprises the steps, carried out by the control server, of: identifying one or more related monitoring keys to be submitted together with at least one of the one or more identified monitoring keys; and submitting to a reporting device, for each of the one or more identified monitoring keys, the identified monitoring key, the determined monitoring quota, and the identified one or more related monitoring keys.

This method also comprises the steps, carried out by the control server, of: receiving from the reporting device, usage information for at least one of the one or more identified monitoring keys, the monitoring quota for the at least one of the one or more identified monitoring keys having been exhausted, and usage information for the identified one or more related monitoring keys submitted together with the at least one monitoring key whose monitoring quota has been exhausted; and, for each service associated with any monitoring key for which usage information has been received, the control server updating the service quota by using the received usage information.

Specially advantageous where the service quota for a service is much higher than the addition of the monitoring quotas for the monitoring keys associated with said service, this method may further comprise the steps, carried out at the control server, of: determining those services for which the service quota is not exhausted after the updating and, for each of those services, identifying the one or more monitoring keys associated with the service; and, for each identified monitoring key, determining a new monitoring quota and submitting, to the reporting device, the identified monitoring key, the new monitoring quota and the one or more related monitoring keys.

In particular, and advantageous for identifying the one or more services, for determining the service quota for each identified service, and for identifying the one or more monitoring keys associated with each identified service, the method may further comprise a step of provisioning, for each user, a subscription profile that comprises one or more identifiers of the one or more services for the user, and wherein each service has a service quota and is associated with one or more monitoring keys.

In an embodiment of the invention amongst several alternatives further discussed, the step in this method of determining the monitoring quota for each identified monitoring key may comprise the steps of: identifying, for each identified monitoring key, one or more services associated with the identified monitoring key; identifying a slice value for each of the one or more identified services; determining a minimum slice value amongst the identified slice values; and setting this minimum slice value as the monitoring quota for the identified monitoring key.

Generally speaking for this method, the monitoring quota, which is submitted from the control server to the reporting device for each identified monitoring key, may be accompanied by a threshold level indicating a type of volume or time for which the monitoring quota applies. Where this is the case, the threshold level may indicate the type of volume as one of: total volume only, uplink volume only, downlink volume only, and uplink and downlink volume.

Also generally speaking, this method may further comprise a step of submitting, from the control server to the reporting device, one or more control rules applicable for an IP Connectivity Access Network, IP-CAN, session established with the user. Where this is the case, and in accordance with an embodiment of the invention, the monitoring quota, which is submitted from the control server to the reporting device for each identified monitoring key, may be distributed in quota portions amongst the one or more control rules, and each quota portion may be accompanied by an indication of the control rule to which the quota portion applies. Alternatively, and in accordance with other embodiment of the invention, the monitoring quota, which is submitted from the control server to the reporting device for each identified monitoring key, may apply to the whole IP-CAN session for the user.

This method is particularly advantageous where applied in a Policy and Charging Control architecture. If this were the case, the control server may be, or may act as, a Policy and Charging Rules Function, PCRF, server and the reporting device may be, or may act as, at least one of a Policy and Charging Enforcement Function, PCEF, device and a Traffic Detection Function, TDF, device.

In accordance with a second aspect of the present invention, there is provided a new method for control of usage of one or more services for a user, the method applying in a reporting device.

This method comprises the steps, carried out at the reporting device, of: receiving one or more monitoring keys from a control server and, for each of the one or more received monitoring keys, a monitoring quota and one or more related monitoring keys; monitoring the monitoring quota for each of the one or more received monitoring keys and, upon determining that the monitoring quota for at least one of the one or more received monitoring keys is exhausted, determining usage information for the at least one monitoring key whose monitoring quota has been exhausted, and usage information for the one or more related monitoring keys; and submitting to the control server the usage information for the at least one monitoring key, whose monitoring quota has been exhausted, and the usage information for the one or more related monitoring keys.

In particular, this method may further comprise a step of storing in a memory of the reporting device, for each of the one or more received monitoring keys, the received monitoring key, the monitoring quota and the related monitoring keys.

Also in particular, the monitoring quota, which is received at the reporting device from the control server for each received monitoring key, may be accompanied by a threshold level indicating a type of volume or time for which the monitoring quota applies. Where this is the case, the threshold level may indicate the type of volume as one of: total volume only, uplink volume only, downlink volume only, and uplink and downlink volume.

Generally speaking, this method may further comprise a step of receiving, at the reporting device from the control server, one or more control rules applicable for an IP Connectivity Access Network, IP-CAN, session established with the user; and a step of enforcing at the reporting device said one or more control rules for the IP-CAN session. Where this is the case, and in accordance with an embodiment of the invention, the monitoring quota, which is received at the reporting device from the control server for each received monitoring key, may be distributed in quota portions amongst the one or more control rules, and each quota portion may be accompanied by an indication of the control rule to which the quota portion applies. Alternatively, and in accordance with other embodiment of the invention, the monitoring quota, which is received at the reporting device from the control server for each received monitoring key, may apply to the whole IP-CAN session for the user. In particular, this method may also comprise a step of establishing the IP-CAN session with the user.

In accordance with a third aspect of the present invention, there is provided a new control server for control of usage of one or more services for a user. This control server comprises a processing unit adapted to identify one or more services for a user, to determine a service quota for each identified service, to identify one or more monitoring keys associated with each identified service, and to determine a monitoring quota for each identified monitoring key. In addition, this processing unit is also adapted to identify one or more related monitoring keys to be submitted together with at least one of the one or more identified monitoring keys.

This control server also comprises an interfacing unit adapted to submit to a reporting device, for each of the one or more identified monitoring keys, the identified monitoring key, the determined monitoring quota and the identified one or more related monitoring keys. Apart from that, this control server also comprises a further interfacing unit adapted to receive from the reporting device usage information for at least one of the one or more identified monitoring keys, the monitoring quota for the at least one of the one or more identified monitoring keys having been exhausted, and usage information for the identified one or more related monitoring keys submitted together with the at least one monitoring key whose monitoring quota has been exhausted.

The processing unit of this control server is also adapted to update the service quota, for each service associated with any monitoring key for which usage information has been received, by using the received usage information.

In particular, this control server may further comprise a memory adapted to store, for each user, a subscription profile that comprises one or more identifiers of the one or more services for the user, and wherein each service has a service quota and is associated with one or more monitoring keys.

Still more particularly, this subscription profile may be provisioned in the memory of the control server, or may be obtained at the control server from an external repository. To this end, the control server may further comprise a second interfacing unit adapted to obtain the subscription profile from the external repository.

Aligned with the methods discussed above, and specially advantageous where the service quota for a service is much higher than the addition of the monitoring quotas for the monitoring keys associated with said service, the processing unit of this control server may further be adapted to: determine those services for which the service quota is not exhausted after the updating; identify, for each of those services, the one or more monitoring keys associated with the service; and determine, for each identified monitoring key, a new monitoring quota. In addition, the interfacing unit may further be adapted to submit to the reporting device, for each identified monitoring key, the identified monitoring key, the new monitoring quota and the one or more related monitoring keys.

Aligned with the method discussed above, and in accordance with an embodiment amongst several alternatives further discussed, the processing unit of this control server, in order to determine the monitoring quota for each identified monitoring key, may be adapted to: identify, for each identified monitoring key, one or more services associated with the identified monitoring key; identify a slice value for each of the one or more identified services; determine a minimum slice value amongst the identified slice values; and set this minimum slice value as the monitoring quota for the identified monitoring key.

As already discussed above for the methods, the monitoring quota, which is submitted from the interfacing unit of the control server to the reporting device for each identified monitoring key, may be accompanied by a threshold level indicating a type of volume or time for which the monitoring quota applies. Where this is the case, the threshold level may indicate the type of volume as one of: total volume only, uplink volume only, downlink volume only, and uplink and downlink volume.

In order to accomplish some advantageous steps of the methods discussed above, the interfacing unit may further be adapted to submit, to the reporting device, one or more control rules applicable for an IP-CAN session established with the user. Where this is the case, and in accordance with an embodiment of the invention, the monitoring quota, which is submitted from the interfacing unit of the control server to the reporting device for each identified monitoring key, may be distributed in quota portions amongst the one or more control rules, and each quota portion may be accompanied by an indication of the control rule to which the quota portion applies. Alternatively, and in accordance with other embodiment of the invention, the monitoring quota, which is submitted from the interfacing unit to the reporting device for each identified monitoring key, may apply to the whole IP-CAN session for the user.

In particular, this control server may be, or may act as, a PCRF server, whereas the reporting device may be, or may act as, at least one of a PCEF device and a TDF device.

In accordance with a fourth aspect of the present invention, there is provided a new reporting device for control of usage of one or more services for a user.

This reporting device comprises an interfacing unit adapted to receive one or more monitoring keys from a control server and, for each of the one or more received monitoring keys, a monitoring quota and one or more related monitoring keys.

This reporting device also comprises a processing unit adapted to monitor the monitoring quota for each of the one or more received monitoring keys and, upon determining that the monitoring quota for at least one of the one or more received monitoring keys is exhausted, the processing unit being adapted to determine usage information for the at least one monitoring key whose monitoring quota has been exhausted, and usage information for the one or more related monitoring keys.

In addition, the reporting device also comprises a further interfacing unit adapted to submit to the control server, the usage information for the at least one monitoring key whose monitoring quota has been exhausted, and the usage information for the one or more related monitoring keys.

In particular, the reporting device may further comprise memory adapted to store, for each of the one or more received monitoring keys, the received monitoring key, the monitoring quota and the related monitoring keys.

As already discussed above for the methods, the monitoring quota, which is received at the interfacing unit from the control server for each received monitoring key, may be accompanied by a threshold level indicating a type of volume or time for which the monitoring quota applies. Where this is the case, the threshold level may indicate the type of volume as one of: total volume only, uplink volume only, downlink volume only, and uplink and downlink volume.

In order to accomplish some advantageous steps of the methods discussed above, the interfacing unit of the reporting device may further be adapted to receive, from the control server, one or more control rules applicable for an IP Connectivity Access Network, IP-CAN, session established with the user; and the reporting device may further comprise an enforcement unit adapted to enforce said one or more control rules for the IP-CAN session. Alternatively, the processing unit of the reporting device may further be adapted to enforce said one or more control rules for the IP-CAN session without needs for a separate and dedicated unit. Where the one or more control rules are received and in accordance with an embodiment of the invention, the monitoring quota, which is received at the interfacing unit from the control server for each received monitoring key, may be distributed in quota portions amongst the one or more control rules, and each quota portion may be accompanied by an indication of the control rule to which the quota portion applies. Alternatively, and in accordance with other embodiment of the invention, the monitoring quota, which is received at the interfacing unit of the reporting device from the control server for each received monitoring key, may apply to the whole IP-CAN session for the user. In particular, this reporting device may comprise a second interfacing unit adapted to establish the IP-CAN session with the user.

On the other hand, the invention may be practised by a computer program, in accordance with a fifth aspect of the invention, the computer program comprising instructions which, when executed on at least one processor, cause the at least one processor to carry out any of the methods discussed above, or both. In particular, there is provided in accordance with a sixth aspect of the invention a computer program product comprising said computer program.

BRIEF DESCRIPTION OF THE DRAWINGS

The features, objects and advantages of the invention will become apparent by reading this description in conjunction with the accompanying drawings, in which:

FIG. 1 represents an overview of PCC architecture.

FIG. 2 and FIG. 3 illustrate different views of relationships between services, monitoring keys, service quotas, and monitoring quotas for a certain user.

FIG. 4a and FIG. 5 show a particular sequence of actions that may be followed in accordance with a first embodiment of a method for control of usage of one or more services for a user.

FIG. 4b and FIG. 5 show a particular sequence of actions that may be followed in accordance with a second embodiment of the method for control of usage of one or more services for a user.

FIG. 6 shows an embodiment of a control server.

FIG. 7 shows a first embodiment of a reporting device.

FIG. 8 shows a second embodiment of a reporting device.

FIG. 9 shows a sequence of actions of a method, in accordance with an embodiment of the invention, for control of usage of one or more services for a user, the method applying in a control server.

FIG. 10 shows a sequence of actions of a method, in accordance with an embodiment of the invention, for control of usage of one or more services for a user, the method applying in a reporting device.

DETAILED DESCRIPTION

Figure 11:
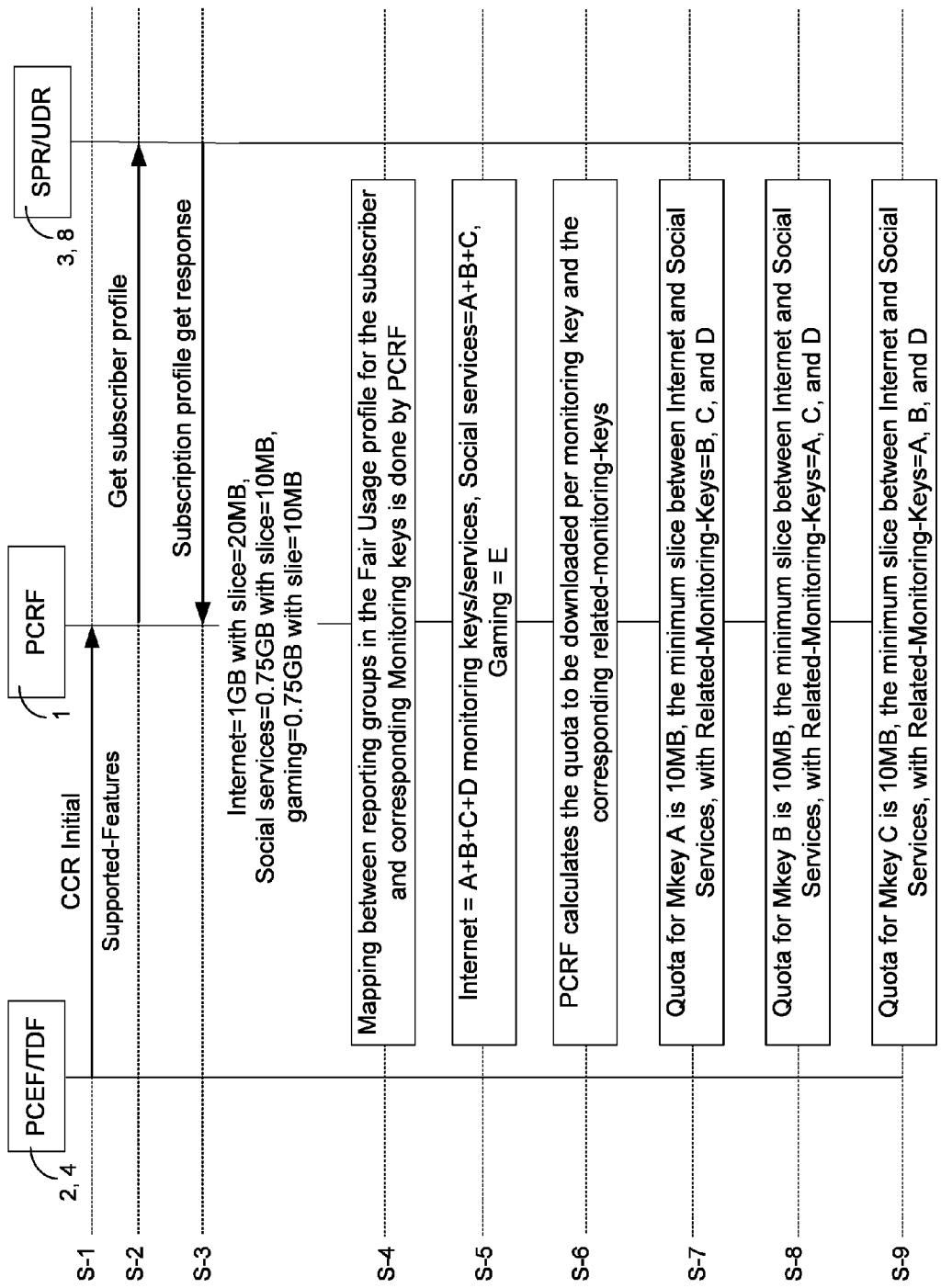
FIG. 11, FIG. 12 and FIG. 13 show a particular sequence of actions that may be followed in accordance with a third embodiment of the method for control of usage of one or more services for a user.

The following describes currently preferred embodiments of a method for control of usage of one or more services for a user, the method applying in a control server; a method for control of usage of one or more services for a user, the method applying in a reporting device; a control server, which in particular may act as a PCRF server of a PCC architecture, for control of usage of one or more services for a user; and a reporting device, which in particular may be at least one of a PCEF device and a TDF device of a PCC architecture, for control of usage of one or more services for a user. This PCRF server 1 communicates with the PCEF device 2 via interface Gx and with the TDF device 4 via interface Sd, as illustrated in FIG. 1. Moreover, the reporting device may be, or act as, a BBERF device 9 in certain scenarios, as disclosed in PCC-related standards, and the PCRF server communicates with the BBERF device via interface Gxx.

Regarding usage information, which may be collected by the PCRF server, nothing in this specification prevents for submitting charging information derivable from the usage information towards an Online Charging System 7, OCS, or towards and Offline Charging System 6, OFCS; the charging information being submitted through the PCEF device to the OCS 7 via interface Gy or to the OFCS 6 via interface Gz.

Currently, there are developments of a Deep Packet Inspection, DPI, device that, to a great extent if not completely, corresponds to the TDF standardized for the PCC architecture. In some developments, this DPI device thus fully corresponds, for the purpose of the present invention, to the TDF device, integrated with the PCEF device or not, as further discussed throughout this specification. In other developments, this DPI device is integrated into an Application Function, AF, server 5 of the PCC architecture. Where this is the case, the features provided for throughout this specification in respect of the TDF device are still applicable to such AF server 5 including the DPI device.

Before explaining in detail these methods, the control server and the reporting device, it is worthwhile to discuss the relationship between the one or more services 100 for a user, the service quota 101 for each service 100, the one or more monitoring keys 210 associated with each service 100, the monitoring quota 201 for each monitoring key 200, and the one or more related monitoring keys 220 to be reported together with at least one of the one or more monitoring keys 200.

As FIG. 2 illustrates, each service 100 for a user is associated with one or more monitoring keys 210. That is, the service Internet is exemplary associated with monitoring keys A, B, C, and D; the service Social Services is exemplary associated with monitoring keys A, B and C; and the service Gaming is exemplary associated with monitoring key E.

Each service 100 illustrated in FIG. 2 is also given a service quota 101. This service quota represents the maximum usage that the user is allowed for this service per data plan period, generally, per month, per week, or per day. For example, the user is allowed to a maximum of 3 Gb usage for Internet, 2 Gb usage for Social Services and 1 Gb usage for Gaming.

The relationship illustrated in FIG. 2 may have the service 100 as input to identify data per service basis. This relationship allows the control server 1 to identify one or more services 100 for a user, to determine a service quota 101 for each identified service 100, and to identify one or more monitoring keys 210 associated with each identified service 100.

This relationship between service 100, monitoring keys 210 and service quota 101, per service basis, may be provided as a subscription profile for each user. A subscription profile, for each of a number of users, may be loaded into an internal memory 10 of the control server 1, or may be provisioned in an external repository accessible to the control server and from where the control server can obtain the relationship. In particular, and especially where the control server is, or acts as, a PCRF server of PCC architecture as illustrated in FIG. 1, this external repository may be a SPR 3 or a UDR 8 operating in accordance with the PCC standards.

In accordance with an embodiment of the invention, by taking into account the relationship illustrated in FIG. 2, the control server 1 may build up, logically or physically in the internal memory 10, the relationship illustrated in FIG. 3. To this end, by exploring all the monitoring keys 210 associated with the one or more services 100 in FIG. 2, the control server identifies the monitoring keys A, B, C, D, and E that are necessary for usage monitoring control of the user. These monitoring keys 200, namely A, B, C, D, and E, may be used as inputs in the relationship illustrated in FIG. 3 to identify data per monitoring key basis.

Then, the control server may identify which services are associated with each individual monitoring key 200. By exploring the relationship shown in FIG. 2, the control server identifies that both Internet and Social Services are services 110 associated with the monitoring key A, and the same occurs for the monitoring keys B and C; whilst the monitoring key D is only associated with Internet, and the monitoring key E is only associated with Gaming. With this routine, the control server may identify the one or more services 110 associated with each individual monitoring key 200, as illustrated in FIG. 3.

Each monitoring key 200 is given in FIG. 3 a monitoring quota 201 that represents the usage quota to be reported, when exhausted, by the reporting device. This monitoring quota may be pre-defined, determined on-line on the basis of different criteria, or determined at the control server on the basis of the number of services 110 associated with each monitoring key 200.

In a quite simple embodiment, the monitoring quota might be given a small value compared to the service quota so that, even where different and more than one service 110 is associated with each monitoring key 200, the contribution on usage of each monitoring quota to the overall service usage is low and the service usage can be properly controlled. For example, the monitoring quota 201 for every monitoring key 200 may be set to a pre-defined value of 20 Mb, which is much lower than the service quotas 101 of 3 Gb, 2 Gb, and 1 Gb given for the Internet, Social Services and Gaming. Under this embodiment, every monitoring key 200, namely A, B, C, D, and E may be assigned a monitoring quota 201 of 20 Mb, what is not illustrated in any drawing.

In another, the monitoring quota might be given a value on the basis of the number of services 110 associated with each monitoring key 200. This value may be pre-defined or determined online, and might adopt a certain proportion, e.g. 10%, of the aggregated service quotas of those services associated with a particular monitoring key. For example, the monitoring quota for monitoring key E may be 100 Mb, whilst the monitoring quota for each monitoring key A, B, C and D may be 500 Mb, which is 10% of 3+2 GB, wherein 3 Gb and 2 Gb are the service quotas respectively given for the Internet and Social Services.

This embodiment may advantageously be enhanced so that the monitoring quota for a monitoring key may adopt a certain proportion, e.g. 10%, of the aggregated service quotas, as before, but taking into account the number of monitoring keys associated with each particular service. For example, the monitoring quota for monitoring key E may still be 100 Mb because such monitoring key is only associated with service Gaming; however, the monitoring quota for each monitoring key A, B, C and D might be 125 Mb, i.e. 500/4, because there are four monitoring keys involved in the two services Internet and Social Services.

Particularly advantageous in a still further embodiment of the invention and for the purpose of determining the monitoring quota for each monitoring key on the basis of the number of services 110 associated with each monitoring key 200, each service 100 in FIG. 2 may also be associated with a slice value 102. As exemplary illustrated, the Internet is given a slice value of 20 Mb, the Social Services is given a slice value of 10 Mb, and the Gaming is given a slice value of 10 Mb.

Where this embodiment is followed, the slice value 102 for each service 100 may be loaded into the internal memory 10 of the control server 1, or may be provisioned in the external repository accessible to the control server and from where the control server can obtain the relationship, as already commented above and in addition to the service 100, monitoring keys 210 and service quota 101. In particular, especially where the control server 1 is, or acts as, the PCRF server, this external repository may be the SPR 3, which communicates with the PCRF server via interface Sp, or the UDR 8, which communicates with the PCRF server via interface Ud, as illustrated in FIG. 1.

In other words, the slice value 102 for each service 100 may be included in the subscription profile for each user.

In this embodiment, the control server 1 identifies the slice value 102 for each individual service 100 of those services 110 associated with each particular monitoring key 200; that is, for monitoring keys A, B and C the control server identifies 20 Mb for Internet and 10 Mb for Social Services, for monitoring key D the control server identifies 20 Mb for Internet, and for monitoring key E the control server identifies 10 Mb for Gaming.

The control server then determines, for each monitoring key, a minimum slice value amongst those slice values identified for each service 100, and sets this minimum value as the monitoring quota for the monitoring key; that is, the minimum slice value between the ones for Internet and Social Services is 10 Mb, so that the monitoring quota for the monitoring keys A, B and C is 10 Mb, whereas the monitoring quota for the monitoring key D, which is only associated with Internet, is 20 Mb and the monitoring quota for the monitoring key E, which is only associated with Gaming, is 10 Mb.

Any of these several embodiments, namely, pre-defined values, or in terms of proportion of the aggregated service quotas, and with or without taking into account the number of associated monitoring keys, or in terms of using slice values as commented above, allows the control server 1 to determine a monitoring quota 201 for each identified monitoring key 200.

Further, and still with reference to FIG. 2 and FIG. 3, the control server 1 may be arranged to identify one or more related monitoring keys 220 to be reported together with each monitoring key 200.

To this end, the control server 1 may identify in the relationship of FIG. 2 that the service 100 Gaming is only associated with one monitoring key 210, namely E, so that this monitoring key E is neither given any related monitoring key 220 to be reported together with E, nor included as a related monitoring key 220 for any other individual monitoring key 200.

Further with this approach, the control server 1 may identify that the service 100 Social Services is associated with monitoring keys A, B and C. Consequently, each one of them is a related monitoring key 220 for the two others. That is, B and C are related monitoring keys 220 for A; A and C are related monitoring keys 220 for B; and, A and B are related monitoring keys 220 for C.

Still further with this approach, the control server 1 may identify that the service 100 Internet is associated with monitoring keys A, B, C and D. Consequently, each one of them is a related monitoring key 220 for the three others. Since the identification of related monitoring keys had already been made for keys A, B and C, the control server just needs to add the monitoring key D to the related monitoring keys for monitoring keys A, B and C; and then consider the A, B and C as related monitoring keys 220 for D.

That is, as illustrated in FIG. 3, monitoring keys B, C and D are related monitoring keys 220 for the monitoring key 200 A; monitoring keys A, C and D are related monitoring keys 220 for the monitoring key 200 B; monitoring keys A, B and D are related monitoring keys 220 for the monitoring key 200 C; monitoring keys A, B and C are related monitoring keys 220 for the monitoring key 200 D; and there is no related monitoring key 220 for the monitoring key 200 E. This relationship allows the control server 1 to identify one or more related monitoring keys 220 to be reported together with at least one of the one or more identified monitoring keys 200.

Once these relationships have been clarified with regard to FIG. 2 and FIG. 3, the method for control of usage of one or more services for a user, which applies in the control server, the method for control of usage of one or more services for a user, which applies in the reporting device, the control server and the reporting device can be further discussed in detail.

FIG. 9 illustrates a method, in accordance with an embodiment of the invention, for control of usage of one or more services for a user, the method applying in a control server 1.

As illustrated in FIG. 9, this method comprises a step S-118 of identifying, at the control server, one or more services 100 for a user, and a step S-122 of determining, at the control server, a service quota 101 for each identified service 100.

This method also comprises a step S-124 of identifying, at the control server, one or more monitoring keys 210 associated with each identified service 100, and a step S-126 of determining, at the control server, a monitoring quota 201 for each identified monitoring key 200.

This method further comprises a step S-128 of identifying, at the control server, one or more related monitoring keys 220 to be reported together with at least one of the one or more identified monitoring keys 200.

All these steps have been discussed above with reference to FIG. 2 and FIG. 3 and under different embodiments.

As illustrated in FIG. 9, this method further comprises a step S-132 of submitting from the control server 1 to a reporting device 2 and/or 4, for each of the one or more identified monitoring keys 200, the identified monitoring key 200, the determined monitoring quota 201 and the identified one or more related monitoring keys 220.

Then, this method also comprises the step S-164 of receiving at the control server, from the reporting device 2 and/or 4, usage information for at least one of the one or more identified monitoring keys 200, the monitoring quota 201 for the at least one of the one or more identified monitoring keys 200 having been exhausted, and usage information for the identified one or more related monitoring keys 220 submitted together with the at least one monitoring key whose monitoring quota has been exhausted.

Upon receipt of such usage information, the method further comprises a step S-166 of updating at the control server, for each service 100 associated with any monitoring key for which usage information has been received, the service quota 101 by using the received usage information.

This method may further comprise, and not illustrated in any drawing, a step of determining at the control server those services 100 for which the service quota is not exhausted after the updating and, for each of those services, identifying the one or more monitoring keys 210 associated with the service 100.

For example, after the updating commented above by using the received usage information, the control server may verify that the service quota of 2 Gb for Social Services has been exhausted and this service has to be blocked according to conventional mechanisms not interesting for this discussion. This means that the accumulated monitoring quotas for monitoring keys A, B and C, which are associated with the Social Services have reached 2 Gb. However, since the service 100 Internet is given a service quota of 3 Gb, and inasmuch as the monitoring quota for monitoring key D has not surpassed 1 Gb, e.g. 500 Mb spent, there are still 500 Mb available for the service Internet. In this situation, the monitoring keys 200 A, B, C and D are now considered to be only associated with the service Internet amongst the services 110 shown in FIG. 3, wherein Social Services is blocked and may be temporary removed from this relationship until a next period in the time plan starts. That is, the control server determines that the service quota for Internet is not exhausted and identifies the monitoring keys A, B, C and D associated with this service Internet.

Then this method may also comprise a step of determining, for each identified monitoring key, a new monitoring quota 201 and a step of submitting, for each identified monitoring key, from the control server to the reporting device, the identified monitoring key 200, the new monitoring quota 201 and the one or more related monitoring keys 220.

In this respect, and already commented above with reference to FIG. 2 and FIG. 3, the step of determining a monitoring quota 201 for each identified monitoring key 200 may include the steps of: identifying one or more services 110 associated with said identified monitoring key 200; identifying a slice value 102 for each of the one or more identified services 100; determining a minimum slice value amongst the identified slice values; and setting this minimum slice value 102 as the monitoring quota 201 for said identified monitoring key.

Following with the previous example where there are still 500 Mb available for the service Internet, which is associated with monitoring keys A, B, C and D, given that the monitoring keys 200 A, B, C and D are now considered to be only associated with the service Internet amongst the services 110 shown in FIG. 3, and given that the slice value 102 for Internet is 20 Mb as shown in FIG. 2, where the optional embodiment of slice values is followed, the control server may determine a new monitoring quota of 20 Mb for the monitoring keys 200 A, B, C and D.

Then, under this embodiments, the control server may submit to the reporting device: the monitoring key A, its new monitoring quota of 20 Mb, and its related monitoring keys B, C and D; the monitoring key B, its new monitoring quota of 20 Mb, and its related monitoring keys A, C and D; the monitoring key C, its new monitoring quota of 20 Mb, and its related monitoring keys A, B and D; and the monitoring key D, its new monitoring quota of 20 Mb, and its related monitoring keys A, B and C.

Particularly in this method illustrated in FIG. 9, though not shown therein, the monitoring quota 201, submitted from the control server to the reporting device for each identified monitoring key 200, may be accompanied by a threshold level indicating a type of volume or time for which the monitoring quota 201 applies. Where this is the case in this method, the threshold level may indicate the type of volume as one of: total volume only, uplink volume only, downlink volume only, and uplink and downlink volume. In this respect, total volume may be interpreted as the total volume in both uplink and downlink directions without distinction about the direction, whereas uplink and downlink volume may be interpreted as the total volume in both uplink and downlink directions with an explicit distinction about the direction.

FIG. 10 illustrates a method, in accordance with an embodiment of the invention, for control of usage of one or more services for a user, the method applying in a reporting device 2 and/or 4.

As illustrated in FIG. 10, this method comprises a step S-100 of establishing an IP-CAN session with a user 50.

This method also comprises a step S-142 of receiving one or more monitoring keys 200 from a control server 1 for reporting usage information and, for each of the one or more received monitoring keys 200, a monitoring quota 201 to monitor usage for the received monitoring key, and one or more related monitoring keys 220 to be reported together with the received monitoring key.

This method further comprises a step S-144 of monitoring the monitoring quota 201 for each of the one or more received monitoring keys 200. Then, upon determining, during a step S-146, that the monitoring quota for at least one of the one or more received monitoring keys 200 is exhausted, the method comprises a step S-152 of determining usage information for the at least one monitoring key 200, whose monitoring quota 201 has been exhausted, and usage information for the one or more related monitoring keys 220 received together with the at least one monitoring key whose monitoring quota has been exhausted.

This method still further comprises a step S-162 of submitting to the control server 1, the usage information for the at least one monitoring key 200, whose monitoring quota 201 has been exhausted, and the usage information for the one or more related monitoring keys 220.

In particular, this method now explained with reference to FIG. 10 may also comprise a step, not illustrated therein, of storing in a memory of the reporting device, for each of the one or more received monitoring keys 200, the received monitoring key 200, the monitoring quota 201 and the related monitoring keys 220. In particular, this memory of the reporting device may be a memory 20 of the PCEF device 2, or a memory 40 of the TDF device 4, or both.

Also particularly in the method illustrated in FIG. 10, though not shown therein, the monitoring quota 201, received from the control server for each received monitoring key 200, may be accompanied by a threshold level indicating a type of volume or time for which the monitoring quota 201 applies. Where this is the case in this method, the threshold level may indicate the type of volume as one of: total volume only, uplink volume only, downlink volume only, and uplink and downlink volume. In this respect, as already commented above, total volume may be interpreted as the total volume in both uplink and downlink directions without distinction about the direction, whereas uplink and downlink volume may be interpreted as the total volume in both uplink and downlink directions with an explicit distinction about the direction.

As already commented above, the control server 1 may, in particular, be or act as a PCRF server of a PCC architecture, and the reporting device 2 and/or 4 may, in particular, be or act as a PCEF device and/or TDF device of the PCC architecture. Moreover, the PCEF device and the TDF device may be provided integrated in a unique device or separate as standalone devices. Furthermore, a BBERF device 9 as illustrated in FIG. 1 may be considered, for the purpose of the present invention, as an exemplary reporting device.

In order to carry out the methods explained above with reference to FIG. 9 and FIG. 10, as well as other embodiments of these methods further commented, there is provided a control server that shares the same structural elements as the PCRF server illustrated in FIG. 6, and there is provided a reporting device that shares the same structural elements as the PCEF device and TDF device respectively illustrated in FIG. 7 and FIG. 8.

There is thus provided a control server 1 for control of usage of one or more services for a user and that, as FIG. 6 illustrates, comprises a processing unit 12 adapted to identify one or more services 100 for a user, to determine a service quota 101 for each identified service 100, to identify one or more monitoring keys 210 associated with each identified service 100, and to determine a monitoring quota 201 for each identified monitoring key 200. This processing unit 12 is also adapted to identify one or more related monitoring keys 220 to be reported together with at least one of the one or more identified monitoring keys 200.

In particular, this processing unit 12 may include at least one processor, or micro-processor, configurable to perform the tasks that the processing unit is adapted to carry out.

As illustrated in FIG. 6, the control server 1 also comprises a first interfacing unit 14a adapted to submit to a reporting device 2 and/or 4, for each of the one or more identified monitoring keys 200, the identified monitoring key 200, the determined monitoring quota 201 and the identified one or more related monitoring keys 220. This control server 1 also comprises a further first interfacing unit 14b adapted to receive, from the reporting device, usage information for at least one of the one or more identified monitoring keys 200, the monitoring quota 201 for the at least one of the one or more identified monitoring keys 200 having been exhausted, and usage information for the identified one or more related monitoring keys 220 submitted together with the at least one monitoring key whose monitoring quota has been exhausted.

The "first interfacing unit adapted to submit" 14a and the "further first interfacing unit adapted to receive" 14b might be embodied in separate units or in a single unit. In the following, for illustration purpose only, the "first interfacing unit adapted to submit" and the "further first interfacing unit adapted to receive" are embodied in a single first interfacing unit 14.

In particular, this first interfacing unit 14 may include an output unit 14a, or sender, and an input unit 14b, or receiver, for communication with the reporting device and thus includes conventional wired or wireless transmission means configurable to submit and receive messages and data that the first interfacing unit is adapted to submit and receive.

Further, the processing unit 12 of the control server is also adapted to update the service quota 101, for each service 100 associated with any monitoring key for which usage information has been received, by using the received usage information.

In particular, and in accordance with previous explanations discussed above with reference to FIG. 2 and FIG. 3, this control server 1 may further comprise a memory 10 adapted to store, for each user, a subscription profile that comprises one or more identifiers of the one or more services for the user, and wherein each service 100 is given a service quota 101 and is associated with one or more monitoring keys 210.

More particularly, this memory 10 may be a volatile memory such as a conventional RAM, especially where the subscriber profile is obtained from an external repository; or, if the memory 10 is wanted to be shared for more static configuration purposes, the memory 10 may be implemented with a non-volatile memory, hard disk, optical disc, magnetic tape, holographic memory driver, a flash-memory or the like.

In order to carry out an advantageous embodiment of the method discussed above with reference to FIG. 9, the processing unit 12 of the control server may further be adapted to: determine those services 100 for which the service quota is not exhausted after the updating; identify, for each of those services, the one or more monitoring keys 210 associated with the service 100, and determine, for each identified monitoring key 200, a new monitoring quota 201; whereas the first interfacing unit 14 of the control server may further be adapted to submit to the reporting device, for each identified monitoring key 200, the identified monitoring key 200, the new monitoring quota 201 and the one or more related monitoring keys 220.

Moreover, and also in order to carry out an advantageous embodiment of the method discussed above with reference to FIG. 9, the processing unit 12 of the control server may, in determining the monitoring quota 201 for each identified monitoring key 200, be adapted to: identify one or more services 110 associated with the identified monitoring key 200; identify a slice value 102 for each of the one or more identified services 100; determine a minimum slice value amongst the identified slice values; and set this minimum slice value 102 as the monitoring quota 201 for the identified monitoring key.

Furthermore, and still in order to carry out an advantageous embodiment of the method discussed above with reference to FIG. 9, the monitoring quota 201, which is submitted from the first interfacing unit 14 to the reporting device for each identified monitoring key 200, is accompanied by a threshold level indicating a type of volume or time for which the monitoring quota 201 applies. Where this is the case, the threshold level may indicate the type of volume as one of: total volume only, uplink volume only, downlink volume only, and uplink and downlink volume.

There is also provided a reporting device for control of usage of one or more services for a user and that shares the same structural elements as the PCEF device 2 illustrated in FIG. 7 and the TDF device 4 illustrated in FIG. 8. In the following, for the sake of simplicity, the structural elements of the reporting device are discussed only with reference to FIG. 7, though a same rationale could be made with reference to FIG. 8 and elements therein.

This reporting device comprises a first interfacing unit 26a adapted to receive one or more monitoring keys 200 from a control server 1 for reporting usage information and, for each of the one or more received monitoring keys 200, a monitoring quota 201 to monitor usage for the received monitoring key, and one or more related monitoring keys 220 to be reported together with the received monitoring key.

This reporting device also comprises a processing unit 22 adapted to monitor the monitoring quota 201 for each of the one or more received monitoring keys 200 and, upon determining that the monitoring quota for at least one of the one or more received monitoring keys 200 is exhausted, the processing unit is further adapted to determine usage information for the at least one monitoring key 200 whose monitoring quota 201 has been exhausted, and usage information for the one or more related monitoring keys 220 received together with the at least one monitoring key whose monitoring quota has been exhausted.

Further, the reporting device also comprises a further first interfacing unit 26b adapted to submit to the control server 1, the usage information for the at least one monitoring key 200 whose monitoring quota 201 has been exhausted, and the usage information for the one or more related monitoring keys 220.

As commented above for the control server, the "first interfacing unit adapted to receive" 26a and the "further first interfacing unit adapted to submit" 26b in this reporting device might be embodied in separate units or in a single unit. In the following, for illustration purpose only, the "first interfacing unit adapted to receive" and the "further first interfacing unit adapted to submit" in the reporting device are embodied in a single first interfacing unit 26. A same approach may be followed regarding the first interfacing unit 46 illustrated in FIG. 8.

As illustrated in FIG. 7, the reporting device may also comprise a second interfacing unit 24 adapted to establish an IP-CAN session with a user 50.

In particular, anyone of the first interfacing unit 26 and the second interfacing unit 24 of the reporting device may include an output unit 26b and 24b, or sender, and an input unit 26a and 24a, or receiver, for communication with the respective other end and they thus include conventional wired or wireless transmission means configurable to submit and receive messages and data that each of the first interfacing unit and second interfacing unit is adapted to submit and receive.

Also in particular, this processing unit 22 of the reporting device may include at least one processor, or micro-processor, configurable to perform the tasks that the processing unit is adapted to carry out.

This reporting device may further comprise a memory 20 adapted to store, for each of the one or more received monitoring keys 200, the received monitoring key 200, the monitoring quota 201 and the related monitoring keys 220.

In particular, this memory 20 may be a volatile memory such as a conventional RAM; or, where the memory 20 is wanted to be shared for more static configuration purposes, the memory 20 may be implemented with a non-volatile memory, hard disk, optical disc, magnetic tape, holographic memory driver, a flash-memory or the like.

Aligned with advantageous features of the control server, also in this reporting device the monitoring quota 201, which is received at the first interfacing unit 26 from the control server 1 for each received monitoring key 200, may be accompanied by a threshold level indicating a type of volume or time for which the monitoring quota 201 applies. Where this is the case, the threshold level may indicate the type of volume as one of: total volume only, uplink volume only, downlink volume only, and uplink and downlink volume.

Further embodiments are discussed in the following, wherein a PCRF server, as control server, interworks with a PCEF device and a TDF device, as reporting devices, to accomplish the above methods commented above with reference to FIG. 9 and FIG. 10 respectively.

FIG. 4a illustrates a first embodiment wherein a PCEF device 2, after having established an IP-CAN session with a user (not illustrated), notifies the establishment of the IP-CAN session to the PCEF server 1 during a step S-102. In accordance with PCC procedures, this notification is assumed as a request for control rules to be applied for the IP-CAN session. In particular, this notification and request for control rules may be a CCR message.

The PCRF server may request and obtain a subscription profile for the user, during respective steps S-105 and S-110, from one of a SPR 3 and a UDR 8. Alternatively and not illustrated in this drawing, the PCRF server may get such user profile configured in its internal memory 10.

Then, the PCRF server may identify one or more services 100 for a user during a step S-115, and may determine a service quota 101 for each identified service 100 during a step S-120. Apart from that, the PCRF server may identify one or more monitoring keys 210 associated with each identified service 100 during a step S-115, and may determine a monitoring quota 201 for each identified monitoring key 200 during a step S-125.

Now, the PCRF server may prepare monitoring information to be submitted to the PCEF device 2 and to the TDF device 4, during a step S-130. To this end and within this step S-130, the PCRF server may identify one or more related monitoring keys 220 to be reported together with at least one of the one or more identified monitoring keys 200.

For example, and as already commented above with reference to FIG. 2 and FIG. 3, the PCRF server may prepare, as monitoring information per monitoring key basis, a package for monitoring key A including: the monitoring key A, its monitoring quota 10 Mb, and its related monitoring keys B, C and D; a package for monitoring key B including: the monitoring key B, its monitoring quota 10 Mb, and its related monitoring keys A, C and D; a package for monitoring key C including: the monitoring key C, its monitoring quota 10 Mb, and its related monitoring keys A, B and D; a package for monitoring key D including: the monitoring key D, its monitoring quota 20 Mb, and its related monitoring keys A, B and C; and a package for monitoring key E including: the monitoring key E, its monitoring quota 10 Mb, and no related monitoring keys, since the monitoring key is not related to any further monitoring key.

It has been assumed in this embodiment that the TDF device is a separate entity from the PCEF device, and that the TDF device operates in a so-called solicited mode, whereby the PCRF server has to initiate a session with the TDF device, namely a TDF session, for the IP-CAN session already established at the PCEF device. Under this embodiment, the PCRF server thus submits to the TDF device 4, during a step S-135, the monitoring information detailed above with a TDF session request. In addition, the PCRF server also submits to the PCEF device 2, during a step S-140, the monitoring information detailed above with an answer to the notification, or rather to the request for control rules; in particular, this answer may be submitted with a CCA message.

In particular, the submission of monitoring information to the TDF device 4 during the step S-135 also includes submitting control rules to the TDF device which the TDF device 4 enforces for the TDF session. The control rules submitted from the PCRF server to the TDF device in this case are Application and Detection Control, ADC, rules in accordance with PCC procedures.

Also in particular, the submission of monitoring information to the PCEF device 2 during the step S-140 also includes submitting control rules to the PCEF device which the PCEF device 2 enforces for the IP-CAN session. The control rules submitted from the PCRF server to the PCEF device in this case are Policy and Charging Control, PCC, rules in accordance with PCC procedures.

Even though the sequence of actions for this first embodiment continues as illustrated in FIG. 5, a second embodiment illustrated in FIG. 4b is firstly discussed in the following because both embodiments in FIG. 4a and in FIG. 4b share the same further sequence of actions illustrated in FIG. 5.

FIG. 4b illustrates a second embodiment wherein any of PCEF device 2 and TDF device 4 alone, or wherein a combined PCEF/TDF device is provided as a unique entity, notifies the PCRF server during a step S-104 of the establishment of an IP-CAN session with the user. In particular, as commented above, this notification may be assumed as a request for control rules to be applied for the IP-CAN session.

In this second embodiment illustrated in FIG. 4b, all the steps carried out to determine, during the step S-130, the monitoring information to be submitted towards the reporting device 2 and/or 4, are the same as for the first embodiment illustrated in FIG. 4a, but for the unique submission from the PCRF server to the PCEF device or TDF device alone, or to the combined PCEF/TDF device, during a step S-138, of the monitoring information detailed above with an answer to the notification, or rather to the request for control rules; in particular, this answer may be submitted with a CCA message.

In particular, this submission of monitoring information to the PCEF device, TDF device, or combined PCEF/TDF device during respective steps S-140, S-135 and S-138 also includes submitting control rules to be enforced therein, these control rules being Policy and Charging Control, PCC, rules, Application and Detection Control, ADC, rules, or combinations thereof.

More generally speaking, both embodiments of the method respectively illustrated in FIG. 4*a* and FIG. 4*b* include the submission, from the PCRF server, namely from the control server, to the TDF device during the step S-135 and to the PCEF device during the step S-140, or to the PCEF/TDF device during the step S-138, of one or more control rules applicable for an IP-CAN session established with the user.

In particular, this step of submitting the one or more control rules may be responsive to the steps S-102 and S-104 of receiving at the control server 1 a request for control rules applicable for the IP-CAN session from any reporting device, namely from the PCEF device 2, from the TDF device 4, or from the PCEF/TDF device. To this end, anyone of the first interfacing unit 26 of the PCEF device and the first interfacing unit 46 of the TDF device may further be adapted to submit, to the PCRF server 1, a request for control rules applicable for the IP-CAN session; and the first interfacing unit 14 of the PCRF server 1 may further be adapted to receive from the PCEF device, the TDF device, or both said request for control rules applicable for the IP-CAN session.

Where the one or more control rules are submitted, and in accordance with a first sub-embodiment shared by both first and second embodiments in FIG. 4*a* and FIG. 4*b*, the monitoring quota 201, which is submitted from the control server and received at the reporting device for each identified monitoring key 200, may be distributed in quota portions amongst the one or more control rules, and each quota portion may be accompanied by an indication of the control rule to which the quota portion applies.

Where the one or more control rules are submitted, and in accordance with a second sub-embodiment shared by both first and second embodiments in FIG. 4*a* and FIG. 4*b*, the monitoring quota 201, which is submitted from the control server and received at the reporting device for each identified monitoring key 200, may apply to the whole IP-CAN session for the user.

To this end, the first interfacing unit 14 of the control server, namely of the PCRF server may further be adapted to submit, to anyone of the PCEF device, TDF device or PCEF/TDF device, they being considered the reporting device, one or more control rules applicable for the IP-CAN session established with the user. And correspondingly, the first interfacing unit 26 of the PCEF device, the first interfacing unit 46 of the TDF device, or the first interfacing unit of the PCEF/TDF device may further be adapted to receive, from the control server 1, the one or more control rules applicable for the IP-CAN session established with the user.

More specifically, where control rules are received during the steps S-135 and S-140, or during the step S-138, at the reporting device, there is a step not illustrated in any drawing of enforcing at the reporting device the one or more received control rules for the IP-CAN session.

To this end, the PCEF device may comprise an enforcement unit 28, the TDF device may comprise an enforcement unit 48 and the PCEF/TDF device may comprise an enforcement unit 28 or 48 adapted to enforce the one or more received control rules for the IP-CAN session. Alternatively, the respective processing unit 22 and 42 of the PCEF device and the TDF device may respectively include said enforcement units 28 and 48, or may be adapted to enforce on its own the one or more received control rules for the IP-CAN session without needs for the enforcement units.

On the other hand, regarding the first sub-embodiment commented above where the one or more control rules are submitted from the control server and received at the reporting device, the control server and the reporting device may be adapted so that the monitoring quota 201, which is submitted from the first interfacing unit 14 of the PCRF server to the PCEF device and TDF device for each identified monitoring key 200, and which is received at the first interfacing unit 26 of the PCEF device and first interfacing unit 46 of the TDF device for each received monitoring key 200, may be distributed in quota portions amongst the one or more control rules, and each quota portion may be accompanied by an indication of the control rule to which the quota portion applies.

Regarding the second sub-embodiment commented above where the one or more control rules are submitted from the control server and received at the reporting device, the control server and the reporting device may be adapted so that the monitoring quota 201, which is submitted from the first interfacing unit 14 of the PCRF server to the PCEF device and TDF device for each identified monitoring key 200, and which is received at the first interfacing unit 26 of the PCEF device and first interfacing unit 46 of the TDF device for each received monitoring key 200, may apply to the whole IP-CAN session for the user.

Moreover, the method in both first and second embodiments illustrated in FIGS. 4*a* and 4*b* may further include a step not illustrated in any drawing of provisioning, for each user, a subscription profile that comprises identifiers of the one or more services for the user, and wherein each service 100 is given a service quota 101 and is associated with one or more monitoring keys 210. In particular, where the slice value 102 is used for determining the monitoring quota 201 for each monitoring key 200, the slice value 102 for each service 100 may be included in the subscription profile.

This subscription profile may be provisioned in the memory 10 of the control server 1, or may be obtained at the control server 1 from one of: the SPR 3 and the UDR 8. To this end, the control server 1 may further comprise a second interfacing unit 16 adapted to obtain the subscription profile from one of: the SPR and the UDR. This second interfacing unit 16 may include an output unit 16*a*, or sender, and an input unit 16*b*, or receiver, for communication with the SPR or UDR, and thus includes conventional wired or wireless transmission means configurable to submit and receive messages and data that second interfacing unit is adapted to submit and receive.

These first and second embodiments illustrated in FIGS. 4*a* and 4*b* continue with a sequence of actions illustrated in FIG. 5, starting at any one of the PCEF device, the TDF device, or the combined PCEF/TDF device, namely, the reporting device which had received the monitoring information, and which thus starts monitoring the traffic, from and to the user, through the IP-CAN session.

As FIG. 5 illustrates, the reporting device determines during a step S-145 that the monitoring quota 201 for the at least one of the one or more identified monitoring keys 200 has been exhausted. In this exemplary case, the reporting device detects that the monitoring quota of 10 Mb for monitoring key A is exhausted. Then, the reporting device determines during a step S-150 those related monitoring keys that were received together with the monitoring key whose monitoring quota has been exhausted. In this exemplary case, the reporting device determines that monitoring keys B, C and D are the related monitoring keys for the monitoring key A. And, then, the reporting device determines during a step S-155 the usage information to be reported for the monitoring key whose monitoring quota has been exhausted, namely 10 Mb for A, and the usage information for the related monitoring keys, namely 5 Mb for B, C and D.

The reporting device submits during a step S-160, to the control server 1, the usage information for the at least one of the one or more identified monitoring keys 200, namely for the monitoring key A, the monitoring quota 201 for the at least one of the one or more identified monitoring keys 200 having been exhausted, and usage information for the identified one or more related monitoring keys 220, which were received together with the at least one monitoring key whose monitoring quota has been exhausted, namely for the related monitoring keys B, C and D. In particular, the usage information may be submitted from the reporting device to the control server in a CCR message.

Upon receipt at the control server, namely the PCRF server, of the usage information for the at least one monitoring key 200, whose monitoring quota has been exhausted, and the usage information for the one or more related monitoring keys 220 that are reported together with the at least one monitoring key 200, the PCRF server updates during a step S-165, for each service 100 associated with any monitoring key for which usage information has been received, the service quota 101 by using the received usage information. In this particular exemplary embodiment, the PCRF server decrements, firstly, the original service quota of 3 Gb available for Internet in the amount resulting from accounting the monitoring quota reported for monitoring keys A, B, C and D; and, secondly, the original service quota of 2 Gb available for Social Services in the amount resulting from accounting the monitoring quota reported for monitoring keys A, B and C.

Further, as also exemplary illustrated in FIG. 5, the PCRF server may determine, during a step no illustrated, those services 100 for which the service quota is not exhausted after the updating and, for each of those services, the PCRF server may identify the one or more monitoring keys 210 associated with the service 100.

Then, for each identified monitoring key 200, the PCRF server may determine during a step S-170 a new monitoring quota 201, and may submit during a step S-175, to the reporting device, the identified monitoring key 200, the new monitoring quota 201 and the one or more related monitoring keys 220. In particular, the new monitoring quota 201 and the one or more related monitoring keys 220, for each identified monitoring key 200, may be submitted from the PCRF server in a CCA message.

The sequence of actions described above with reference to FIG. 4a and FIG. 5, or with reference to FIG. 4a and FIG. 5, are particular and exemplary embodiments of the methods previously explained with respective references to FIG. 9 and FIG. 10.

Further particular and exemplary embodiments, of the methods previously explained with respective references to FIG. 9 and FIG. 10, are described in the following with reference to FIG. 11, FIG. 12 and FIG. 13.

As illustrated in FIG. 11, a Gx session creation is received at the PCRF server during a step S-1 from the PCEF/TDF device. During a step S-2, the PCRF server requests a subscription profile to SPR/UDR. During a step S-3, the PCRF server receives the subscription profile, which in particular may be a Fair Usage profile for the subscriber, including information for Internet, Social Services and Gaming, about service quotas and applicable slices.

During steps S-4 and S-5, the PCRF server internally maps the reporting groups (Internet, Social Services and Gaming) received in the subscription profile to the monitoring keys: Internet=A+B+C+D; Social Services=A+B+C; and Gaming=E.

Figure 12:
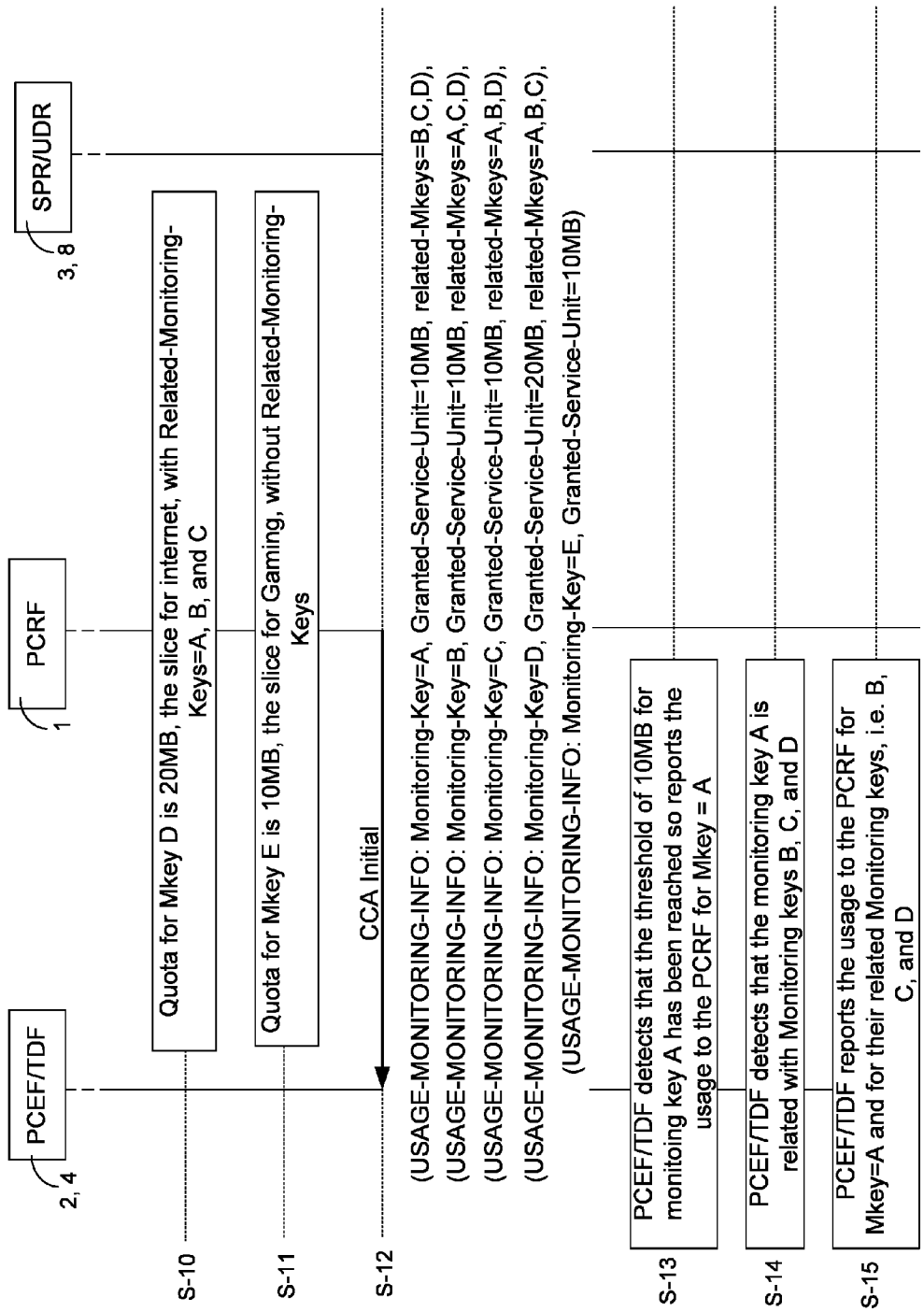

During steps S-6 to S-11, in FIG. 11 and FIG. 12, the PCRF server calculates the monitoring quotas for the monitoring keys A, B, C, D, and E considering the configured slices. For those monitoring keys related to others, like A, B, C and D, the PCRF server considers the minimum volume slice for all them. For those monitoring keys without relation to others, like E, the PCRF server considers the configured slice.

Thus, the PCRF server determines during steps S-7 to S-11: 10 MB is the monitoring quota (minimum slice) applicable to monitoring key=A; 10 MB is the monitoring quota (minimum slice) applicable to monitoring key=B; 10 MB is the monitoring quota (minimum slice) applicable to monitoring key=C; 20 MB is the monitoring quota (minimum slice) applicable to monitoring key=D; and 10 MB is the volume quota (slice) applicable to Monitoring key=E.

Still with reference to FIG. 12, during a step S-12, the PCRF server downloads, to the PCEF/TDF device, the calculated monitoring quotas in the answer to the session creation procedure.

Figure 13:
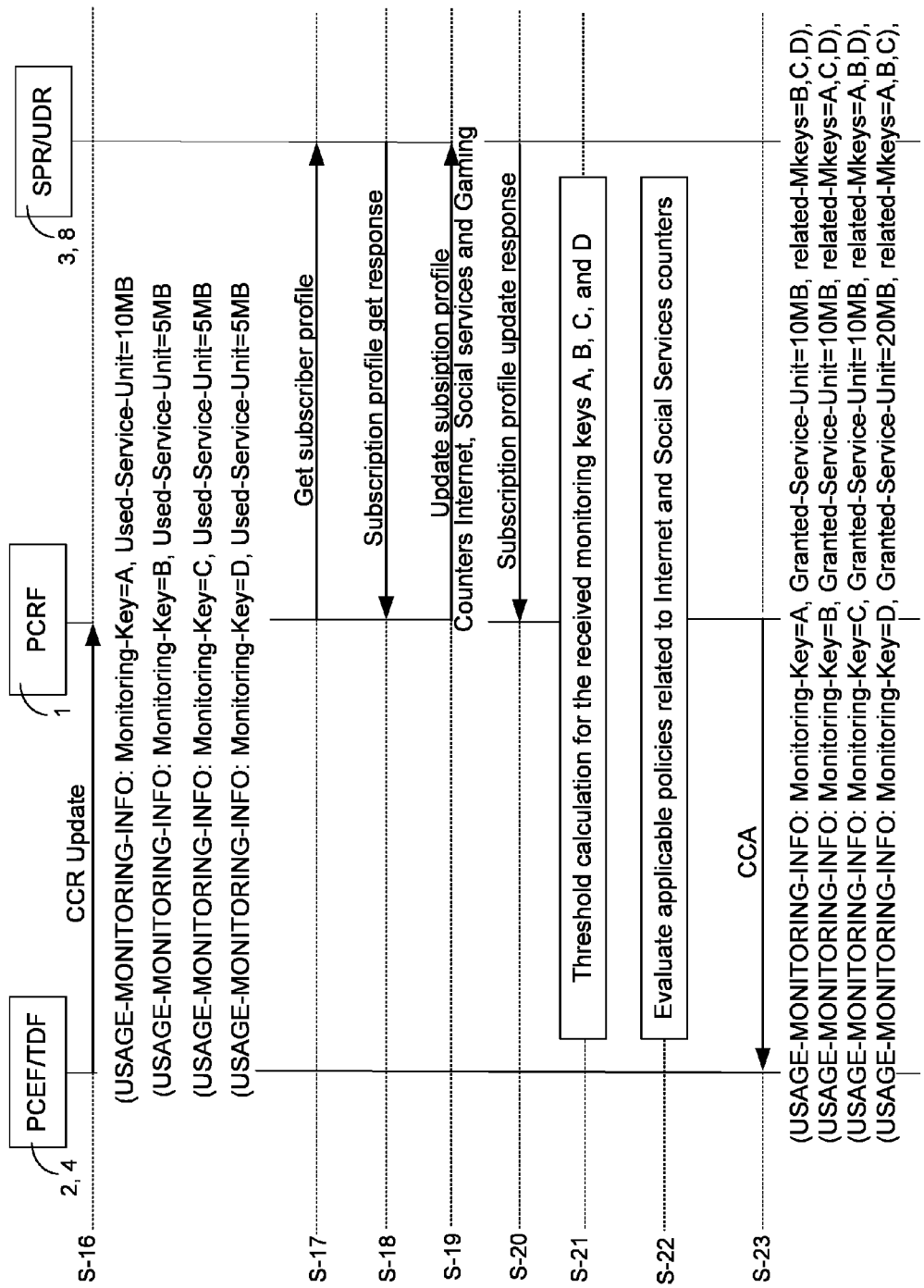

During steps S-13 to S-16, in FIG. 12 and FIG. 13, the PCEF/TDF device detects that monitoring quota (10 MB) for monitoring key A has been exhausted and includes in the corresponding CCR-U not only the usage information for A, but also for B, C and D (usage information indicating 5 MB per each them), since the PCRF server previously informed that they are related monitoring keys.

During steps S-17 to S-20 in FIG. 13, the PCRF server, after receiving the CCR-U, gets the subscription profile from the SPR/UDR and updates the service quota for Internet and Social Services with the information received from the PCEF/TDF device.

Then, during a step S-21, the PCRF server may calculate the monitoring quotas to be downloaded to the PCEF/TDF device, as described for steps S-7 to S-11. Same monitoring quotas may result until the monitoring quota is higher than the remaining quota, in which case, the remaining quota is downloaded.

Apart from that, during a step S-22, the PCRF server may evaluate applicable policies for Internet and Social Services. Eventually, during a step S-23, the PCRF server may answer to the session update procedure including the resulting new monitoring quotas for monitoring keys A, B, C and D, plus their corresponding related monitoring keys.

The invention may also be practised by a computer program, comprising instructions which, when executed on at least one processor, cause the at least one processor to carry out the method according to any of the embodiments discussed above.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for control of usage of one or more services for a user, the method applying in a control server and comprising the steps of:
the control server identifying one or more services for a user, and determining a service quota for each identified service;
the control server identifying one or more monitoring keys associated with each identified service, and determining a monitoring quota for each identified monitoring key;
the control server identifying one or more related monitoring keys to be submitted together with at least one of the one or more identified monitoring keys;
submitting from the control server to a reporting device, for each of the one or more identified monitoring keys, the identified monitoring key, the determined monitoring quota, and the identified one or more related monitoring keys;
receiving at the control server, from the reporting device, usage information for at least one of the one or more identified monitoring keys, the monitoring quota for the at least one of the one or more identified monitoring keys having been exhausted, and usage information for the identified one or more related monitoring keys submitted together with the at least one monitoring key whose monitoring quota has been exhausted; and
for each service associated with any monitoring key for which usage information has been received, the control server updating the service quota by using the received usage information.

2. The method of claim 1, further comprising the steps of:
determining at the control server those services for which the service quota is not exhausted after the updating and, for each of those services, identifying the one or more monitoring keys associated with the service; and
for each identified monitoring key, determining a new monitoring quota and submitting, from the control server to the reporting device, the identified monitoring key, the new monitoring quota and the one or more related monitoring keys.

3. The method of claim 1, further comprising a step of provisioning, for each user, a subscription profile that comprises one or more identifiers of the one or more services for the user, and wherein each service has a service quota and is associated with one or more monitoring keys.

4. The method of claim 1, wherein the step of determining the monitoring quota for each identified monitoring key comprises the steps of:
identifying, for each identified monitoring key, one or more services associated with the identified monitoring key;
identifying a slice value for each of the one or more identified services;
determining a minimum slice value amongst the identified slice values; and
setting this minimum slice value as the monitoring quota for the identified monitoring key.

5. The method of claim 1, wherein the monitoring quota, submitted from the control server to the reporting device for each identified monitoring key, is accompanied by a threshold level indicating a type of volume or time for which the monitoring quota applies.

6. The method of claim 5, wherein the threshold level indicates the type of volume as one of: total volume only, uplink volume only, downlink volume only, and uplink and downlink volume.

7. The method of claim 1, further comprising a step of submitting, from the control server to the reporting device, one or more control rules applicable for an IP Connectivity Access Network, IP-CAN, session established with the user.

8. The method of claim 7, wherein the monitoring quota, submitted from the control server to the reporting device for each identified monitoring key, is distributed in quota portions amongst the one or more control rules, and each quota portion is accompanied by an indication of the control rule to which the quota portion applies.

9. The method claim 7, wherein the monitoring quota, submitted from the control server to the reporting device for each identified monitoring key, applies to the whole IP-CAN session for the user.

10. A method for control of usage of one or more services for a user, the method applying in a reporting device and comprising the steps of:
receiving one or more monitoring keys from a control server and, for each of the one or more received monitoring keys, a monitoring quota and one or more related monitoring keys;
monitoring the monitoring quota for each of the one or more received monitoring keys and, upon determining that the monitoring quota for at least one of the one or more received monitoring keys is exhausted, determining usage information for the at least one monitoring key whose monitoring quota has been exhausted, and usage information for the one or more related monitoring keys; and
submitting to the control server the usage information for the at least one monitoring key, whose monitoring quota has been exhausted, and the usage information for the one or more related monitoring keys.

11. The method of claim 10, further comprising a step of storing in a memory (of the reporting device, for each of the one or more received monitoring keys, the received monitoring key, the monitoring quota and the related monitoring keys.

12. The method of claim 10, wherein the monitoring quota, received from the control server for each received monitoring key, is accompanied by a threshold level indicating a type of volume or time for which the monitoring quota applies.

13. The method of claim 12, wherein the threshold level indicates the type of volume as one of: total volume only, uplink volume only, downlink volume only, and uplink and downlink volume.

14. The method of claim 10, further comprising a step of receiving, from the control server, one or more control rules applicable for an IP Connectivity Access Network, IP-CAN, session established with the user; and a step of enforcing said one or more control rules for the IP-CAN session.

15. The method of claim 14, wherein the monitoring quota, received from the control server for each received monitoring key, is distributed in quota portions amongst the one or more control rules, and each quota portion is accompanied by an indication of the control rule to which the quota portion applies.

16. The method of claim 14, wherein the monitoring quota, received from the control server for each received monitoring key, applies to the whole IP-CAN session for the user.

17. A control server for control of usage of one or more services for a user, the control server comprising:
a processor adapted to identify one or more services for a user, to determine a service quota for each identified service, to identify one or more monitoring keys associated with each identified service, and to determine a monitoring quota for each identified monitoring key;

the processor being further adapted to identify one or more related monitoring keys to be submitted together with at least one of the one or more identified monitoring keys;

an interface being adapted to submit to a reporting device, for each of the one or more identified monitoring keys, the identified monitoring key, the determined monitoring quota and the identified one or more related monitoring keys;

a further interface being adapted to receive from the reporting device usage information for at least one of the one or more identified monitoring keys, the monitoring quota for the at least one of the one or more identified monitoring keys having been exhausted, and usage information for the identified one or more related monitoring keys submitted together with the at least one monitoring key whose monitoring quota has been exhausted; and the processor being adapted to update the service quota, for each service associated with any monitoring key for which usage information has been received, by using the received usage information.

18. The control server of claim 17, further comprising a memory adapted to store, for each user, a subscription profile that comprises one or more identifiers of the one or more services for the user, and wherein each service has a service quota and is associated with one or more monitoring keys.

19. The control server of claim 17, wherein the processor is further adapted to:
determine those services for which the service quota is not exhausted after the updating,
identify, for each of those services, the one or more monitoring keys associated with the service, and
determine, for each identified monitoring key, a new monitoring quota;
and wherein the interface is further adapted to submit to the reporting device, for each identified monitoring key, the identified monitoring key, the new monitoring quota and the one or more related monitoring keys.

20. The control server of claim 17, wherein the processor, in determining the monitoring quota for each identified monitoring key, is adapted to:
identify, for each identified monitoring key, one or more services associated with the identified monitoring key;
identify a slice value for each of the one or more identified services;
determine a minimum slice value amongst the identified slice values; and
set this minimum slice value as the monitoring quota for the identified monitoring key.

21. The control server of claim 17, wherein the monitoring quota, which is submitted from the interface to the reporting device for each identified monitoring key, is accompanied by a threshold level indicating a type of volume or time for which the monitoring quota applies.

22. The control server of claim 21, wherein the threshold level indicates the type of volume as one of: total volume only, uplink volume only, downlink volume only, and uplink and downlink volume.

23. The control server of claim 17, wherein the interface is further adapted to submit, to the reporting device, one or more control rules applicable for an IP Connectivity Access Network, IP-CAN, session established with the user.

24. The control server of claim 23, wherein the monitoring quota, which is submitted from the interface to the reporting device for each identified monitoring key, is distributed in quota portions amongst the one or more control rules, and each quota portion is accompanied by an indication of the control rule to which the quota portion applies.

25. The control server of claim 23, wherein the monitoring quota, which is submitted from the interface to the reporting device for each identified monitoring key, applies to the whole IP-CAN session for the user.

26. A reporting device for control of usage of one or more services for a user, the reporting device comprising:
an interface adapted to receive one or more monitoring keys from a control server and, for each of the one or more received monitoring keys, a monitoring quota and one or more related monitoring keys;
a processor adapted to monitor the monitoring quota for each of the one or more received monitoring keys and, upon determining that the monitoring quota for at least one of the one or more received monitoring keys is exhausted, the processor being adapted to determine usage information for the at least one monitoring key whose monitoring quota has been exhausted, and usage information for the one or more related monitoring keys; and
a further interface being adapted to submit to the control server, the usage information for the at least one monitoring key whose monitoring quota has been exhausted, and the usage information for the one or more related monitoring keys.

27. The reporting device of claim 26, further comprising a memory adapted to store, for each of the one or more received monitoring keys, the received monitoring key, the monitoring quota and the related monitoring keys.

28. The reporting device of claim 26, wherein the monitoring quota, which is received at the interface from the control server for each received monitoring key, is accompanied by a threshold level indicating a type of volume or time for which the monitoring quota applies.

29. The reporting device of claim 28, wherein the threshold level indicates the type of volume as one of: total volume only, uplink volume only, downlink volume only, and uplink and downlink volume.

30. The reporting device of claim 26, wherein the interface is further adapted to receive, from the control server, one or more control rules applicable for an IP Connectivity Access Network, IP-CAN, session established with the user; and wherein the reporting device further comprises an enforcement processor adapted to enforce said one or more control rules for the IP-CAN session.

31. The reporting device of claim 30, wherein the monitoring quota, which is received at the interface from the control server for each received monitoring key, is distributed in quota portions amongst the one or more control rules, and each quota portion is accompanied by an indication of the control rule to which the quota portion applies.

32. The reporting device of claim 30, wherein the monitoring quota, which is received at the interface from the control server for each received monitoring key, applies to the whole IP-CAN session for the user.

* * * * *